(12) United States Patent
Shaaban et al.

(10) Patent No.: US 12,198,202 B2
(45) Date of Patent: Jan. 14, 2025

(54) SYSTEMS AND METHODS FOR TIME ENTRY, MANAGEMENT AND BILLING

(71) Applicant: Fulcrum Global Technologies Inc., Chicago, IL (US)

(72) Inventors: Ahmed Farouk Shaaban, South Barrington, IL (US); Venkat Thandra, South Barrington, IL (US); Andrew Kenneth Blazaitis, Rochester, MN (US)

( * ) Notice: Subject to any disclaimer, the term of this patent is extended or adjusted under 35 U.S.C. 154(b) by 292 days.

(21) Appl. No.: 17/718,019

(22) Filed: Apr. 11, 2022

(65) Prior Publication Data
US 2023/0057372 A1   Feb. 23, 2023

Related U.S. Application Data

(60) Provisional application No. 63/235,187, filed on Aug. 20, 2021.

(51) Int. Cl.
G06Q 40/12 (2023.01)

(52) U.S. Cl.
CPC .................. *G06Q 40/125* (2013.12)

(58) Field of Classification Search
CPC ...................................... G06Q 40/125
See application file for complete search history.

(56) References Cited

U.S. PATENT DOCUMENTS

| | | | | |
|---|---|---|---|---|
| 6,735,574 B2 * | 5/2004 | Bull | ...................... | G06Q 10/10 705/320 |
| 7,089,243 B1 * | 8/2006 | Zhang | .................. | G06F 16/252 707/999.009 |
| 8,712,882 B2 * | 4/2014 | Niazi | ................. | G06Q 10/1091 705/320 |
| 9,953,386 B2 * | 4/2018 | Baldwin | ................. | G06F 16/51 |
| 10,789,575 B2 * | 9/2020 | Bansal | .................... | G06F 3/048 |
| 10,796,383 B2 * | 10/2020 | Shaaban | .................. | G09C 1/00 |

(Continued)

FOREIGN PATENT DOCUMENTS

| WO | 2016004123 A1 | 1/2016 |
|---|---|---|
| WO | 2016004126 A1 | 1/2016 |

(Continued)

OTHER PUBLICATIONS

Behr, Alyson. "Review: 3 Financial Tracking Apps for Busy Contractors." Computerworld.com 2016: n. pag. Print. (Year: 2016).*

(Continued)

*Primary Examiner* — Ashford S Hayles
(74) *Attorney, Agent, or Firm* — Global IP Counselors, LLP

(57) ABSTRACT

Systems and methods for time entry, management and billing are disclosed herein. In an embodiment, a method of collaborative time entry includes generating a first graphical user interface on a first user terminal that allows a first user to link a first time entry to a second user, storing in a memory at least a portion of time entry data from the first time entry, creating a second time entry on a second graphical user interface on a second user terminal, the second time entry including at least the portion of the time entry data from the first time entry, and generating a report including the first time entry and the second time entry.

20 Claims, 23 Drawing Sheets

(56) References Cited

U.S. PATENT DOCUMENTS

| | | | |
|---|---|---|---|
| 10,810,640 B1* | 10/2020 | Cheung | G06Q 10/1097 |
| 10,896,470 B2 | 1/2021 | Shaaban et al. | |
| 10,990,985 B2* | 4/2021 | Stern | G06Q 30/04 |
| 11,138,566 B2 | 10/2021 | Shaaban et al. | |
| 11,144,583 B2 | 10/2021 | Shaaban et al. | |
| 2002/0165749 A1* | 11/2002 | Northcutt | G06Q 10/06 705/7.23 |
| 2003/0033167 A1* | 2/2003 | Arroyo | G06Q 10/103 705/7.42 |
| 2003/0033226 A1* | 2/2003 | Anderson | G06Q 10/1091 705/32 |
| 2003/0204367 A1* | 10/2003 | Hartigan | G07C 1/00 702/178 |
| 2003/0225989 A1* | 12/2003 | Licalsi | G06Q 30/04 711/167 |
| 2004/0064567 A1* | 4/2004 | Doss | G06Q 10/063114 709/228 |
| 2004/0236650 A1* | 11/2004 | Zapiec | H04L 12/14 714/E11.195 |
| 2004/0267595 A1* | 12/2004 | Woodings | G06Q 10/063112 705/7.14 |
| 2005/0049903 A1* | 3/2005 | Raja | G06Q 40/125 705/32 |
| 2005/0192822 A1* | 9/2005 | Hartenstein | G06Q 50/01 705/319 |
| 2007/0006126 A1* | 1/2007 | Calkins | G06Q 10/06 717/102 |
| 2007/0055592 A1* | 3/2007 | Vu | G06Q 40/125 705/32 |
| 2007/0094109 A1* | 4/2007 | Perry | G06Q 10/109 705/32 |
| 2007/0100714 A1* | 5/2007 | Walker | G06Q 10/06 705/32 |
| 2009/0157537 A1* | 6/2009 | Miller | G06Q 10/109 348/161 |
| 2009/0181642 A1* | 7/2009 | Bekanich | H04L 12/14 455/406 |
| 2009/0187443 A1* | 7/2009 | Hart | G06Q 10/063114 705/7.15 |
| 2009/0234780 A1* | 9/2009 | Drucker | G06Q 30/0283 705/418 |
| 2009/0260055 A1* | 10/2009 | Parmar | H04L 63/102 726/4 |
| 2010/0100463 A1* | 4/2010 | Molotsi | G06Q 10/04 705/1.1 |
| 2010/0211486 A1* | 8/2010 | Abrashkin | G06Q 10/00 705/34 |
| 2011/0191218 A1* | 8/2011 | Muir | G06Q 10/1091 705/32 |
| 2012/0084108 A1* | 4/2012 | Bohannon | G06Q 10/06 705/7.12 |
| 2012/0284605 A1 | 11/2012 | Sitrick et al. | |
| 2012/0284635 A1 | 11/2012 | Sitrick et al. | |
| 2013/0006690 A1* | 1/2013 | Doss | G06Q 10/063114 705/7.18 |
| 2013/0173486 A1* | 7/2013 | Peters | G06Q 10/00 705/319 |
| 2013/0297468 A1* | 11/2013 | Hirsch | G06Q 10/109 705/32 |
| 2014/0013252 A1* | 1/2014 | Ehrler | G06Q 10/06 715/764 |
| 2014/0040780 A1* | 2/2014 | Artzt | H04L 65/403 715/753 |
| 2014/0258057 A1* | 9/2014 | Chen | G06Q 10/105 705/32 |
| 2014/0310139 A1* | 10/2014 | Cornet | G06Q 10/1091 705/32 |
| 2015/0156232 A1* | 6/2015 | Sharma | G06F 3/0486 715/753 |
| 2016/0034987 A1 | 2/2016 | Shaaban | |
| 2016/0125511 A1 | 5/2016 | Shaaban et al. | |
| 2016/0140528 A1 | 5/2016 | Shaaban et al. | |
| 2016/0203530 A1 | 7/2016 | Shaaban et al. | |
| 2016/0210572 A1 | 7/2016 | Shaaban et al. | |
| 2017/0004550 A1 | 1/2017 | Shaaban et al. | |
| 2017/0083871 A1 | 3/2017 | Chang et al. | |
| 2017/0109834 A1 | 4/2017 | Shaaban et al. | |
| 2017/0169520 A1* | 6/2017 | Cornet | G06Q 40/125 |
| 2017/0372250 A1* | 12/2017 | Kanakadandi | G06Q 40/125 |
| 2018/0114166 A1* | 4/2018 | Takasaki | G06Q 10/06316 |
| 2018/0189733 A1* | 7/2018 | Newhouse | G06F 16/9558 |
| 2019/0066057 A1 | 2/2019 | Shaaban et al. | |
| 2019/0108271 A1 | 4/2019 | Vikramaratne | |
| 2019/0156385 A1 | 5/2019 | Shaaban et al. | |
| 2019/0279161 A1 | 9/2019 | Shaaban et al. | |
| 2019/0279179 A1 | 9/2019 | Shaaban et al. | |
| 2019/0356499 A1* | 11/2019 | Demonsant | H04L 63/08 |
| 2020/0090236 A1* | 3/2020 | Martin | H04M 15/58 |
| 2020/0380612 A1* | 12/2020 | Derry | G06Q 40/12 |
| 2021/0012290 A1 | 1/2021 | Shaaban et al. | |
| 2021/0042378 A1 | 2/2021 | Shaaban et al. | |
| 2021/0043100 A1 | 2/2021 | Shaaban et al. | |
| 2021/0049535 A1 | 2/2021 | Shaaban et al. | |
| 2021/0049714 A1 | 2/2021 | Shaaban et al. | |
| 2021/0075615 A1 | 3/2021 | Shaaban et al. | |
| 2021/0100375 A1 | 4/2021 | Shaaban et al. | |
| 2021/0150489 A1* | 5/2021 | Haramati | G06Q 10/06316 |
| 2022/0121881 A1 | 4/2022 | Shaaban et al. | |

FOREIGN PATENT DOCUMENTS

| | | |
|---|---|---|
| WO | 2016004127 A1 | 1/2016 |
| WO | 2016004128 A1 | 1/2016 |
| WO | 2016004129 A1 | 1/2016 |
| WO | 2016004132 A1 | 1/2016 |
| WO | 2016004133 A1 | 1/2016 |
| WO | 2016004135 A1 | 1/2016 |
| WO | 2016004138 A2 | 1/2016 |
| WO | 2016004445 A1 | 1/2016 |
| WO | 2016007334 A1 | 1/2016 |
| WO | 2016018632 A1 | 2/2016 |
| WO | 2016029194 A1 | 2/2016 |
| WO | 2018045126 A1 | 3/2018 |
| WO | 2019036310 A1 | 2/2019 |
| WO | 2022086813 A1 | 4/2022 |

OTHER PUBLICATIONS

Needleman, Ted. "Time & Billing, or Full Practice Management? (Software Review)." Accounting Today 17.8 (2003): 24-. Print. (Year: 2003).*

Knaster, Barry. "Keeping Track of the Time Trackers." Accounting Technology 2001: 34-. Print. (Year: 2001).*

International Search Report and Written Opinion issued Aug. 18, 2022 in corresponding International Application No. PCT/US22/31626.

* cited by examiner

SYSTEMS AND METHODS FOR TIME ENTRY, MANAGEMENT AND BILLING

PRIORITY

This application claims priority to U.S. Provisional Application No. 63/235,187, filed Aug. 20, 2021, entitled "Systems and Methods for Time Entry, Management and Billing", the entire contents of which is incorporated herein by reference and relied upon.

BACKGROUND

Technical Field

This disclosure generally relates to systems and methods for time entry, management and billing.

Background Information

Various time entry tools exist. However, many existing tools have limited functionality and require excess processing power and memory storage capacity to manage large amounts of data.

SUMMARY

It has been discovered that new systems and methods for time entry, management and billing are desired, particularly new systems and methods which improve the user experience, optimize processing, and conserve memory space.

A first aspect of the present disclosure is to provide a system for collaborative time entry. The system includes a plurality of user terminals, at least one memory, and at least one processor. The plurality of user terminals includes at least a first user terminal corresponding to a first user and a second user terminal corresponding to a second user. Each user terminal includes a user input device configured to receive one or more time entries. The at least one memory is configured to store time entry data corresponding to the one or more time entries. The at least one processor is programmed to: (i) cause generation of a first graphical user interface on the first user terminal that allows a first user to link a first time entry to a second user; (ii) cause the memory to store at least a portion of the time entry data from the first time entry; (iii) cause creation of a second time entry on a second graphical user interface on the second user terminal, the second time entry including at least the portion of the time entry data from the first time entry; and (iv) cause generation of a report including the first time entry and the second time entry.

A second aspect of the present disclosure is to provide a method of collaborative time entry. The method includes generating a first graphical user interface on a first user terminal that allows a first user to link a first time entry to a second user, storing in a memory at least a portion of time entry data from the first time entry, creating a second time entry on a second graphical user interface on a second user terminal, the second time entry including at least the portion of the time entry data from the first time entry, and generating a report including the first time entry and the second time entry.

A third aspect of the present disclosure is to provide another system for collaborative time entry. The system includes at least one memory and at least one processor. The at least one memory is configured to store time entry data corresponding to one or more time entries. The at least one processor is programmed to: (i) cause generation of a first graphical user interface on a first user terminal that allows a first user to link a first time entry to a second user; (ii) cause the memory to store at least a portion of the time entry data from the first time entry; (iii) cause creation of a second time entry on a second graphical user interface on a second user terminal, the second time entry including at least the portion of the time entry data from the first time entry; and (iv) cause generation of a report including the first time entry and the second time entry.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure:

FIGS. 3 to 23 illustrate various example embodiments of user interfaces generated by the system of FIG. 1 in accordance with the methods discussed herein.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
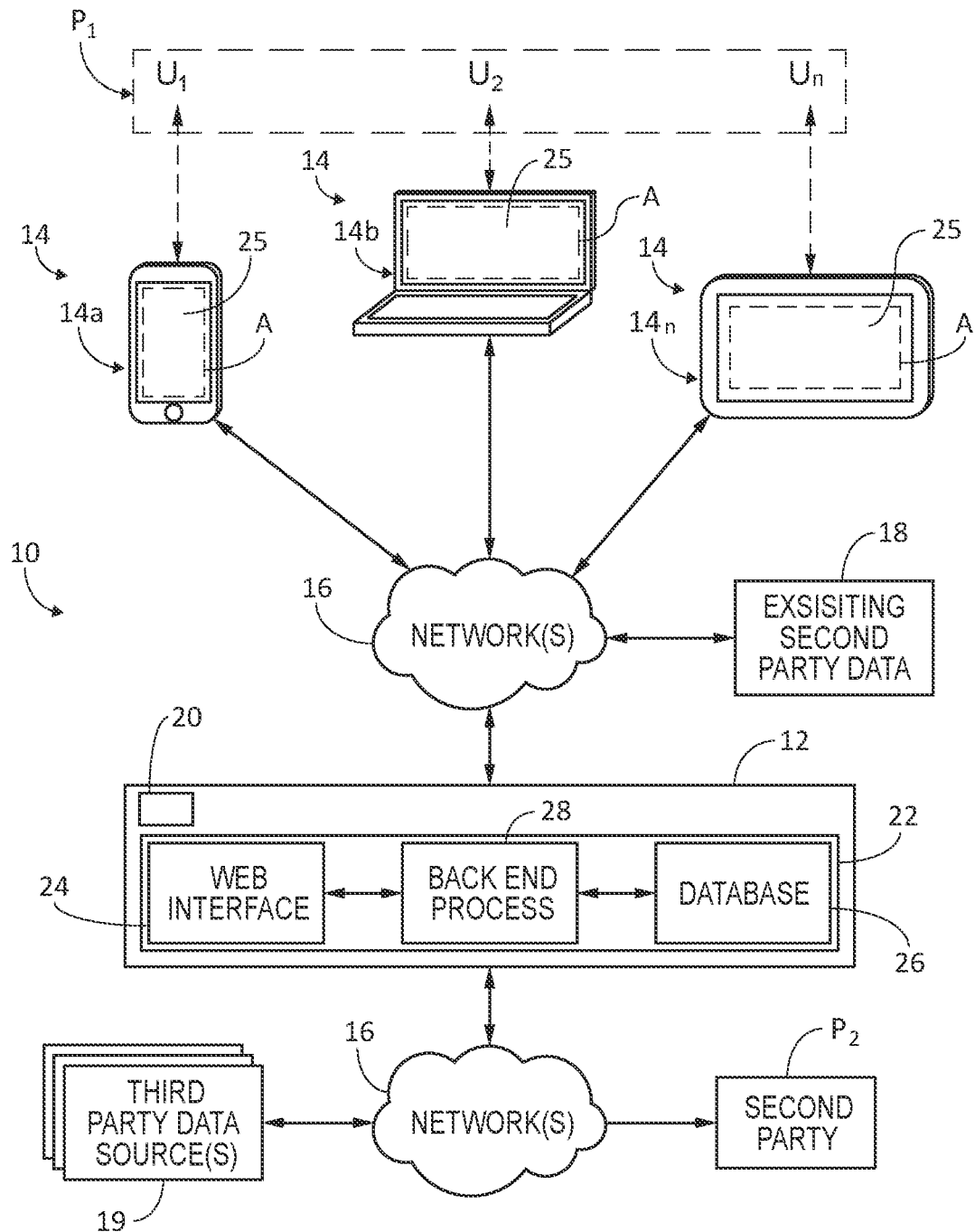
FIG. 1 illustrates an example embodiment of a system for time entry, management and billing in accordance with the present disclosure.

FIG. 1 illustrates an example embodiment of a system 10 for time entry, management and billing. In the illustrated embodiment, the system 10 includes a central server 12 and one or more user terminals 14 operated by one or more users $U_1, U_2 \ldots U_n$ of a first party $P_1$. In use, the central server 12 is configured to wirelessly communicate with each of the user terminals 14 via a network 16 to manage the first party $P_1$'s time entries, work-in-progress reports and/or billing reports to one or more clients. The one or more clients are referred to herein as second parties $P_2$. In an embodiment, the central server 12 can communicate with one or more second parties $P_2$ via the network 16.

Each of the plurality of user terminals 14 can be, for example, a cellular phone, a tablet, a personal computer, a smart watch, or another electronic device. Here, the plurality of user terminals 14 includes a first user terminal 14a, a second user terminal 14b, and an nth user terminal 14n. Each user terminal 14 can be controlled by a distinct user $U_1$, $U_2 \ldots U_n$ (e.g., a first user $U_1$ controls the first user terminal 14a, a second user $U_2$ controls the second user terminal 14b, and an nth user $U_n$ controls the nth user terminal 14n). The user $U_1, U_2 \ldots U_n$ of each user terminal 14 can be, for example, a member or employee of the first party $P_1$. As used herein, each of the users $U_1, U_2 \ldots U_n$ can also be referred to generally as a user U. In an embodiment, the first party $P_1$ can be any business that uses time entries to bill clients, such as a consulting firm, law firm, accounting firm, or any other business.

The first party $P_1$ can include a single user U or group of users $U_1, U_2 \ldots U_n$. Although a single first party $P_1$ and a single second party $P_2$ are discussed herein for simplicity, it should be understood from this disclosure that the system 10 can operate to support any number of such parties and significantly decreases time spent on time entries and memory storage as the number of users and second parties $P_2$ increases.

The system 10 is configured to access various data sources. As seen in FIG. 1, the system 10 is configured to access an existing second party data source 18 and a third party data source 19. The existing second party data source 18 can include a database controlled by the first party $P_1$ using the system 10, for example, an existing client intake database or directory of current and former clients. In an embodiment, the existing second party data source 18 can include one or more a legacy database which was previously used by the first party $P_1$ or a related party such as a subsidiary, sibling or parent company. The third party data source 19 can include one or more data source which is controlled by a third party and accessed by the central server 12 via the network 16, for example, a website controlled by a third party. In an embodiment, the third party data source 19 is accessible by the system 10 via a public website. In an embodiment, the system 10 is also configured to receive data directly from the second party $P_2$ via the network 16.

The user terminals 14 can communicate with the central server 12 via various communication protocols, for example, via an Internet Protocol Suite or TCP/IP supporting HTTP. The network 16 can comprise a public network (e.g., the Internet, World Wide Web, etc.), a private network (e.g., local area network (LAN), etc.), and/or combinations thereof (e.g., a virtual private network, LAN connected to the Internet, etc.). The network 16 can include a wired network, a wireless network, and/or a combination of the two.

The central server 12 can comprise one or more server computers, database servers and/or other types of computing devices, particularly in connection with, for example, the implementation of websites and/or enterprise software. The central server 12 can further comprise a central processor 20 and a central memory 22. The central processor 20 is configured to execute instructions programmed into and/or stored by the central memory 22. In an embodiment, the central processor 20 can comprise one or more of a microprocessor, microcontroller, digital signal processor, co-processor or the like or combinations thereof capable of executing stored instructions and operating upon stored data, wherein the instructions and/or data are stored by the central memory 22. The central memory 22 can comprise one or more devices such as volatile or nonvolatile memory, for example, random access memory (RAM) or read only memory (ROM). Further, the central memory 22 can be embodied in a variety of forms, such as a hard drive, optical disc drive, floppy disc drive, etc. As described in more detail below, the steps of the methods described herein can be stored as instructions in the central memory 22 and executed by the central processor 20.

In the illustrated embodiment, the central memory 22 can include a web interface 24, a database 26, and back end processing instructions 28. Here, the web interface 24, the database 26, and the back end processing instructions 28 can be controlled or accessed by the central processor 20 implementing appropriate software programs by executing the back end processing instructions 28 or other instructions programmed into and/or stored by the central memory 22.

The web interface 24 can provide a graphical user interface ("GUI") 25 that can be displayed on a terminal 14 for a user U, and can manage the transfer of data received from and sent to the GUI 25 on the terminal 14. For example, the GUI 25 can be employed by a user U to enter time entries related to second party $P_2$ and to provide corresponding time entry data to the central server 12. In an embodiment, each user terminal 14 can include an application A comprising software downloaded to and executed by the user terminal 14 to provide the GUI 25 and to manage communications with the central server 12. The application A can be downloaded to the user terminal 14 from the central server 12 or from some other source such as an application distribution platform. In an embodiment, the application A is also viewed via a web browser.

The database 26 is configured to store time entry data related to time entries entered by users U into a respective GUI 25 of a respective user terminal 14. The database 26 is also configured to store data relevant to the second party $P_2$, as well as data retrieved from the second party $P_2$, an existing second party data source 18, and/or a third party data source 19. In an embodiment, the database 26 can comprise a database management system (DBMS) operating on one or more suitable database server computers. Alternatively, the database 26 can comprise storage components from other systems, such as an existing client management tool having relevant data concerning the second party $P_2$ already stored therein. Examples of other data that can be stored in the database 26 include, but are not limited to, time entry data related to time entries entered by users U into a respective GUI 25 of a respective user terminal 14 and/or editable rules regarding generation of each respective GUI 25 of a respective user terminal 14.

The back end processing instructions 28 can be operatively coupled to both the web interface 24 and the database 26, and can be programmed into and/or stored by the central memory 22 and implemented by the central processor 20. In an embodiment, the back end processing instructions 28 can be executed by the central processor 20 to direct operations of the central server 12 as described below in further detail. For example, the central processor 20, executing the back end processing instructions 28, can manage the receipt, storage, maintenance, etc. of relevant data (e.g., time entry data received from one or more user U of the first party $P_1$ via a terminal 14) concerning the second party $P_2$. Additionally, the central processor 20, executing the back end processing instructions 28, can develop similar data relevant to the second party $P_2$ based on information obtained from the second party $P_2$, an existing second party databases 18, and/or a third party data source 19, as well as further functions discussed in more detail below.

Figure 2:
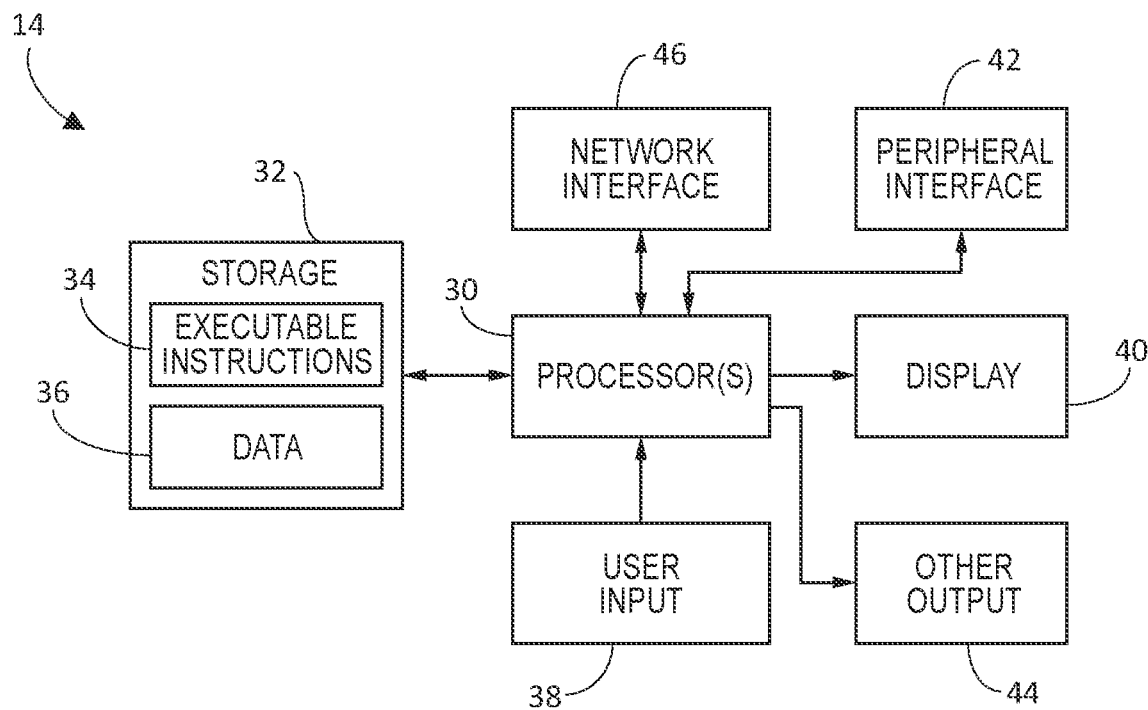
FIG. 2 is a representative diagram of an example embodiment of a user terminal which can be used in the system of FIG. 1.

FIG. 2 illustrates a representative diagram of an example embodiment of a user terminal 14. As illustrated, a user terminal 14 can include a terminal processor 30 and a terminal memory 32. The terminal processor 30 is configured to execute instructions programmed into and/or stored by the terminal memory 32. The instructions can be received from and/or periodically updated by the web interface 24 of the central server 12 in accordance with the methods discussed herein. As described in more detail below, many of the functions described herein can be stored as instructions in the terminal memory 32 and executed by the terminal processor 30.

In an embodiment, the terminal processor 30 can comprise one or more of a microprocessor, microcontroller, digital signal processor, co-processor or the like or combinations thereof capable of executing stored instructions 34 and operating upon stored data 36, wherein the instructions 34 and/or stored data 36 are stored by the terminal memory 32. The terminal memory 32 can comprise one or more devices such as volatile or nonvolatile memory, for example, random access memory (RAM) or read only memory (ROM). Further, the terminal memory 32 can be embodied in a variety of forms, such as a hard drive, optical disc drive, floppy disc drive, etc. In an embodiment, many of the processing techniques described herein are implemented as a combination of executable instructions 34 and data 36 stored within the terminal memory 32.

As illustrated, each of the plurality of user terminals 14 includes one or more user input device 38, a display 40, a peripheral interface 42, one or more other output device 44, and a network interface 46 in communication with the terminal processor 30. The user input device 38 can include any mechanism for providing a user input to the terminal processor 30, for example, a keyboard, a mouse, a touch screen, a microphone and/or suitable voice recognition application, or another input mechanism. The display 40 can include any conventional display mechanism such as a cathode ray tube (CRT), a flat panel display, a touch screen, or another display mechanism. Thus, as can be understood, the user input device 38 and/or the display 40 and/or any other suitable element can be considered a GUI 25. The peripheral interface 42 can include the hardware, firmware, and/or other software necessary for communication with various peripheral devices, such as media drives (e.g., magnetic disk or optical disk drives), other processing devices, or another input source used as described herein. Likewise, the other output device 44 can optionally include similar media drive mechanisms, other processing devices or other output destinations capable of providing information to a user of the user terminal 14, such as speakers, LEDs, tactile outputs, etc. The network interface 46 can comprise hardware, firmware and/or software that allows the terminal processor 30 to communicate with other devices via wired or wireless networks 16, whether local or wide area, private or public. For example, such networks 16 can include the World Wide Web or Internet, or private enterprise networks, or the like.

While the user terminal 14 has been described as one form for implementing the techniques described herein, those having ordinary skill in the art will appreciate from this disclosure that other functionally equivalent techniques can be employed. For example, some or all of the functionality implemented via executable instructions can also be implemented using firmware and/or hardware devices such as application specific integrated circuits (ASICs), programmable logic arrays, state machines, etc. Further, other implementations of the user terminal 14 can include a greater or lesser numbers of components than those illustrated. Further still, although a single user terminal 14 is illustrated in FIG. 2, it should be understood from this disclosure that a combination of such devices can be configured to operate in conjunction (for example, using known networking techniques) to implement the methods described herein.

Figure 3:
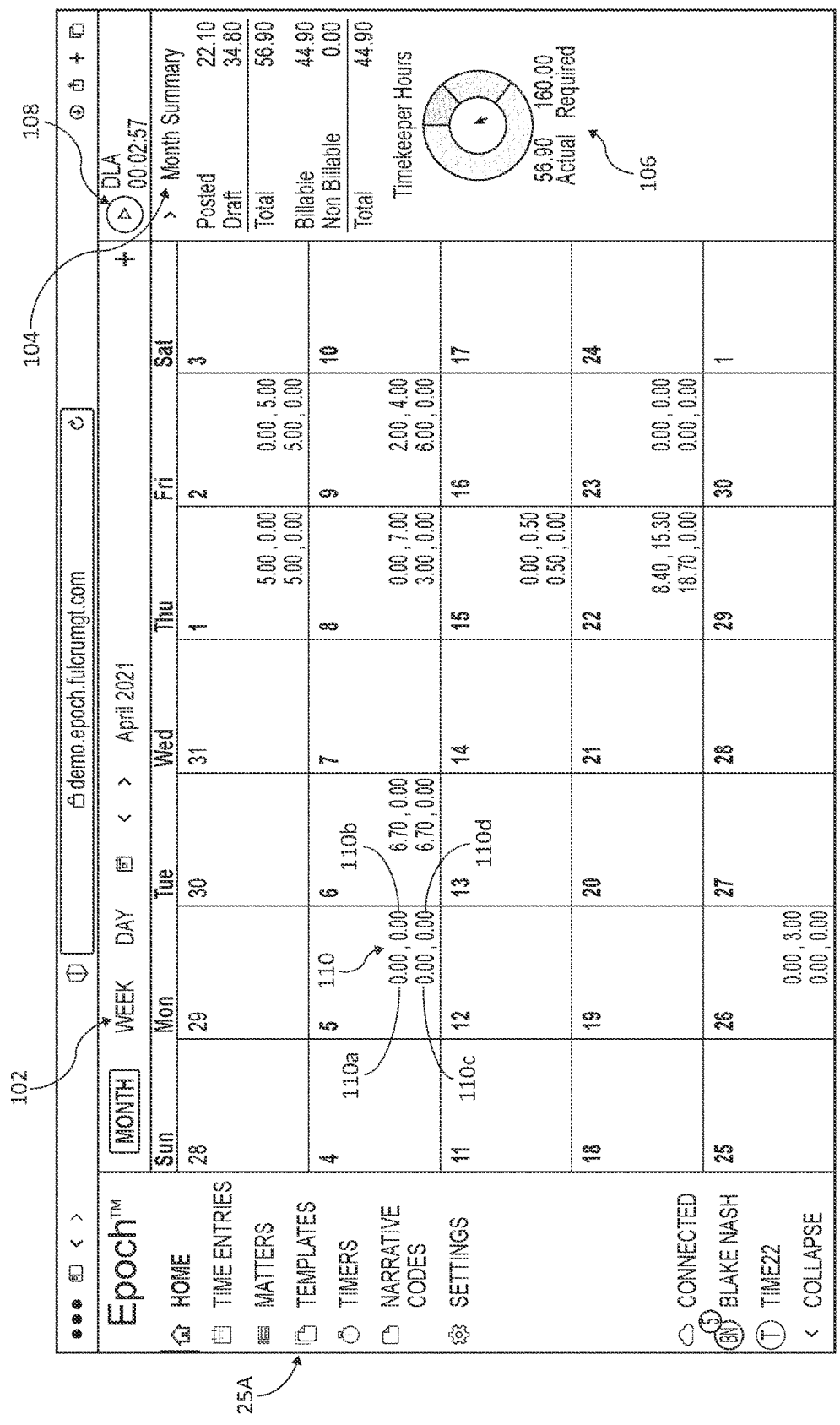

FIG. 3 illustrates an example embodiment of a first GUI 25A displayed on a user terminal 14 (e.g., a first user terminal 14*a*) for a user U (e.g., a first user $U_1$) in accordance with the present disclosure. The first GUI 25A is a home screen configured to display a summary of the time entry data for the respective user U over a predetermined period (here, e.g., a month for a first user $U_1$). In the illustrated embodiment, the first GUI 25A is in a calendar format to allow a user U to select (e.g., click on) any day to enter time entry data for that day. Here, the calendar format can be set as month, week, or day using a calendar format selection panel 102. The first GUI 25A further includes a month summary panel 104 which shows the time entry statistics for the user U in numerical format and a timekeeper hourly summary panel 106 which shows the time entry statistics for the user U in graphical format. The first GUI 25A further includes a running timer 108. The running timer 108 can be activated or deactivated by the user U by selecting (e.g., clicking on) the illustrated button. When activated, the running timer 108 records the total amount of time until deactivated.

In the illustrated embodiment, the monthly summary panel 104 includes posted time, draft time, billable time, and nonbillable time. The posted time is the total time from one or more time entries that have been finalized for the user U. The draft time is the total time from one or more time entries that have not yet been finalized for the user U. The billable time is total time from one or more time entries that is related to a billable matter that will be included in a billing report to a second party $P_2$. The nonbillable time is the total time from one or more time entries that is related to a billable matter that will not be billed to second party $P_2$. A user U can view more detailed summaries of each of these types of time entries by selecting (e.g., clicking on) a respective type using the first GUI 25A. Each of these times is also broken down by individual days within each day of the calendar. Here, each day includes at least one displayed time value 110 for that day. For example, numerous days show a daily posted time value 110*a*, a daily draft time value 110*b*, a daily billable time value 110*c*, and a daily nonbillable time value 110*d*. In an embodiment, the user U selecting any of these values causes generation of a GUI which includes more details about the time entry data associated with the time value 110.

In an embodiment, the time recorded by the running timer 108 is exported into a time entry 112. More specifically, the system 10 is configured to automatically generate an editable time entry 114 including the time recorded by the running timer 108. For example, stopping the running timer 108 can trigger generation of an editable time entry 114 which includes the total time from the running timer 108. The system 10 is further configured to round the time from the time entry to a specified decimal. In an embodiment, the user U is enabled by the system 10 to set the specified decimal (e.g., 0.1 hrs, 0.25 hrs, 0.5 hrs, etc.) for rounding.

The running timer 108 can be a specific running timer 108 associated with a specific client or matter or can be a general running timer 108 without being associated with a specific client or matter. In an embodiment, a time entry 112, 114 can be generated from either type of running timer 108. If the running timer 108 is not associated with a specific client or matter, the system 10 is configured to create a usable time icon that is configured to be selected by a user U to input additional details regarding client and/or matter. The user U can then convert the usable time icon into the time entry 112, 114 by inputting the specific client number or matter number. If the running timer 108 is associated with a specific client or matter, the system 10 is configured to create a time segment icon which can be converted into a time entry 112, 114 either on its own or in combination with other similar time segment icons as described herein.

In an embodiment, the running timer 108 can be started and stopped on a smart watch controlled by the user U. This allows the user U to enable the running timer 108 when away from a personal computer or another electronic device which displays the GUI 25. In an embodiment, the smart watch exports the total time from the running timer 108, and the system 10 creates a usable time icon, time segment icon and/or time entry 112, 114 on a GUI 25 as discussed herein. Thus, in an embodiment, a user terminal 14 is a smart watch with a running timer 108, and a user U can start or stop the running timer 108 as the user goes about his or her day. Each time the user U stops the running timer, the user can export the time data to the central server 12. Then, when the user U accesses his or her data from another user terminal 14, the user U can view and/or edit an editable time entry 114 corresponding to the time recorded with the user U's smart watch. The editable time entry 114 can include, for example, the data and total time that the timer 108 ran for. In an embodiment, the editable time entry 114 can also include or indicate a location based on GPS data from the user U's smart watch to remind the user of where the time was taken, thus reminding the user what the time corresponds to for further editing.

Each time an editable time entry 114 is generated, time entry data corresponding to the time entry is stored. More specifically, the time entry data is stored in the central memory 22. The time entry data can include, for example, data corresponding to a second party $P_2$ (e.g., a client number), data corresponding to one or more of a plurality of matters for a second party $P_2$ (e.g., a matter number), data corresponding to the user U corresponding to the time entry (e.g., a timekeeper number), data related to the date and total time of the time entry, data related to a narrative corresponding to the time entry, and/or the like. The present disclosure improves the storage capacity of the central memory 22 by minimizing time entry data related to individual time entries and linking time entry data where possible, as discussed in more detail below.

In an embodiment, the system 10 causes certain data to be saved on the terminal memory 32 to conserve memory capacity on the central memory 22. In an embodiment, the system 10 stores time entry data on the terminal memory 32 until the time entry data becomes an editable time entry 114. In another embodiment, the system 10 stores time entry data on the terminal memory 32 until the time entry data becomes a posted time entry 112. In an embodiment, when a user U wishes to access certain time entry data from a different user terminal 14, the central processor 20 accesses the terminal memory 32 where the respective time entry data is stored and transfers it to the different user terminal 14. In this way, the system 10 conserves memory space at the central memory 22 by utilizing the terminal memories 32 for certain time entry data.

Figure 4:
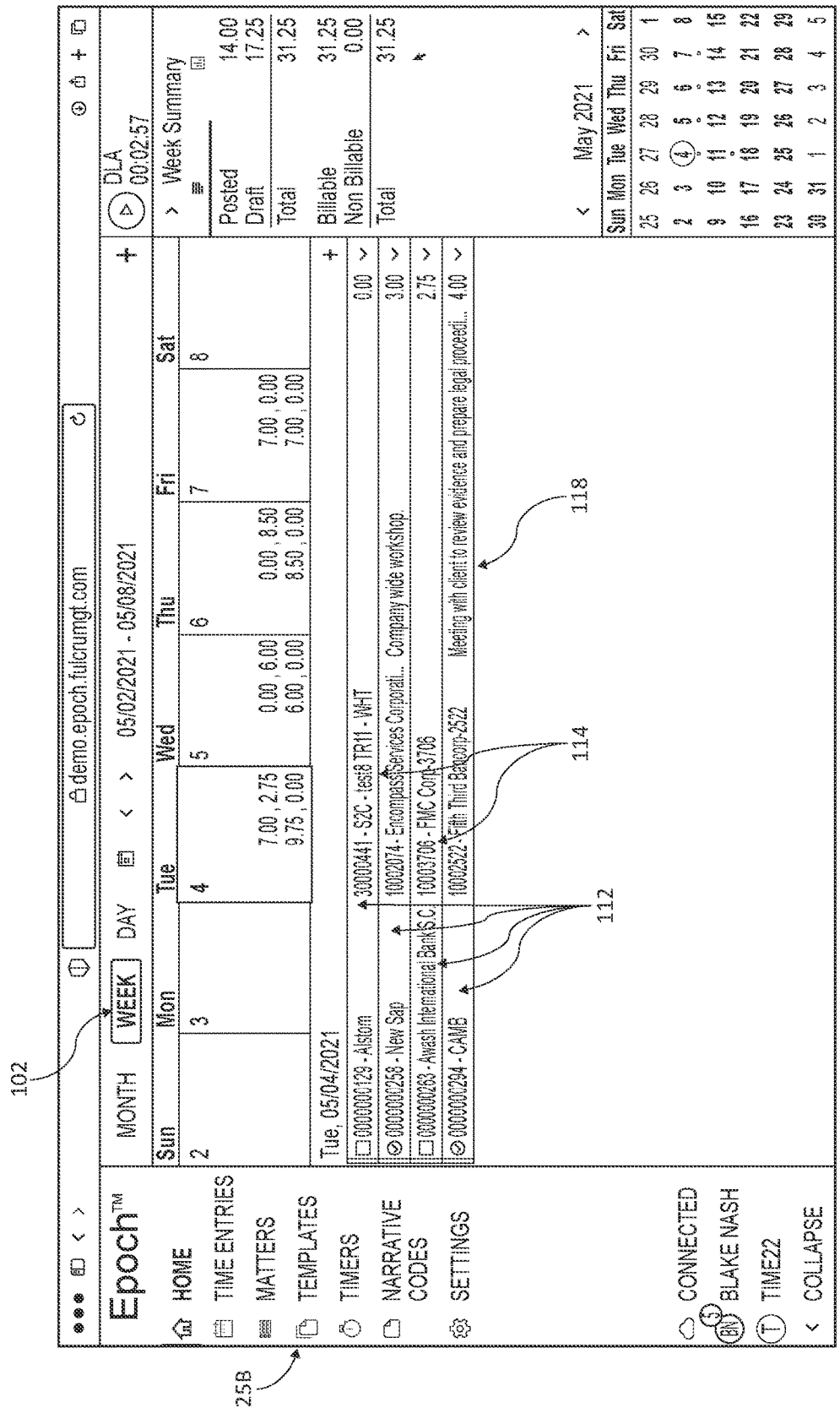

FIG. 4 illustrates an example embodiment of a second GUI 25B displayed on a user terminal 14 (e.g., a first user terminal 14a) for a user U (e.g., a first user $U_1$) in accordance with the present disclosure. In the illustrated embodiment, the system 10 automatically causes generation of the second GUI 25B when a user U selects a day in the monthly view of the first GUI 25A. That is, clicking on a day in the first GUI 25A has automatically triggered the calendar format selection panel 102 to switch to from the month view to the week view. In the illustrated embodiment, the second GUI 25B includes a daily interface 118 which displays information about the time entries 112, 114 which correspond to the daily posted time 110a, daily draft time 110b, daily billable time 110c, and/or daily nonbillable time 110d in the first GUI 25A. In the illustrated embodiment of FIG. 4, the second GUI 25B is showing four time entries 112, two of which are editable time entries 114, and the other two of which have already posted.

Figure 5:
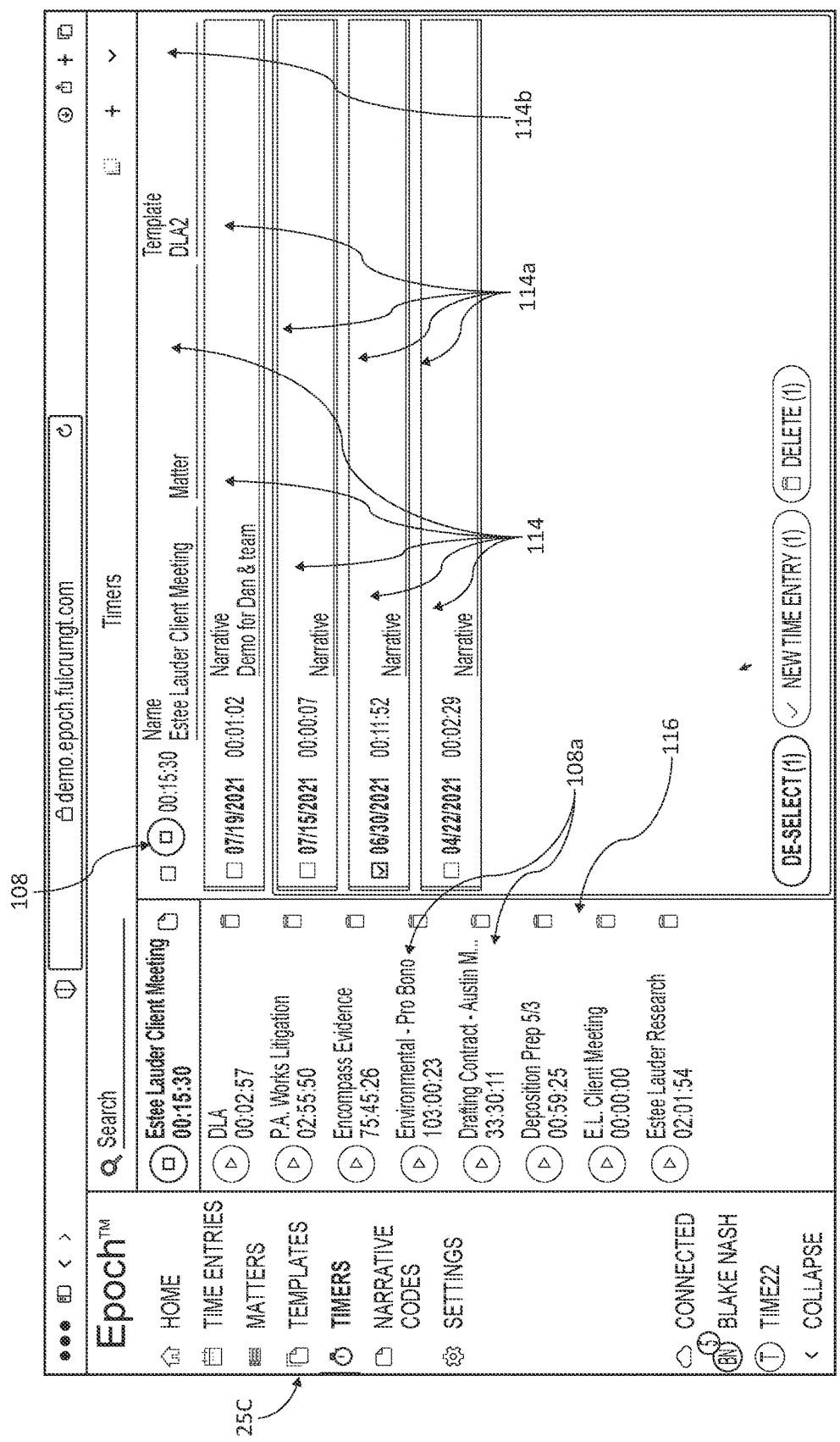

FIG. 5 illustrates an example embodiment of a third GUI 25C displayed on a user terminal 14 (e.g., a first user terminal 14a) for a user U (e.g., a first user $U_1$) in accordance with the present disclosure. When the system 10 exports the time recorded by the running timer 108 into an editable time entry 114, the editable time entries 114 are displayed in the third GUI 25C. In an embodiment, the editable time entry includes an amount of time transmitted to the central server 12 from a user U's smart watch. In the illustrated embodiment, the third GUI 25C displays a first view 114a for a plurality of editable time entries 114. The first view 114a corresponds to editable time entries in which the running timer 108 has already started, stopped and triggered the generation of the first view 114a. The third GUI 25C also displays a second view 114b for an editable time entry 114. The second view 114b includes the running time 108. When a user U clicks on the running timer 108 to stop the running timer 108, the system 10 automatically converts the second view 114b into a first view 114a. In an embodiment, the system 10 automatically imports the running timer from a first GUI 25A and/or a second GUI 25B into the second view 114b of the third GUI 25C when the system causes the generation of the third GUI 25C. More specifically, the system 10 determines whether there is an existing running timer 108 and automatically generates a second view 114b for an editable time entry 114 which includes the running timer 108.

At this point, the editable time entries 114 can also be displayed in the first GUI 25A and/or the second GUI 25B as a draft entry. The system 10 automatically populates the day that the time was recorded and the total time and stores these variables in the central memory 22. The user U can then enter a client or matter number corresponding to a second party P2 and/or a narrative into the editable time entry 114 and finalize the editable time entry 114 so that it is displayed as a posted time entry on the first GUI 25A and the second GUI 25B. In an embodiment, the user U selecting a saved running timer 108a in the running timer panel 116 will cause the system 10 to generate a second view 114b of an editable time entry 114 including that saved running timer 108a. In an embodiment, the user U can then continue to record time by selecting that running timer in the second view 114b.

Figure 6:
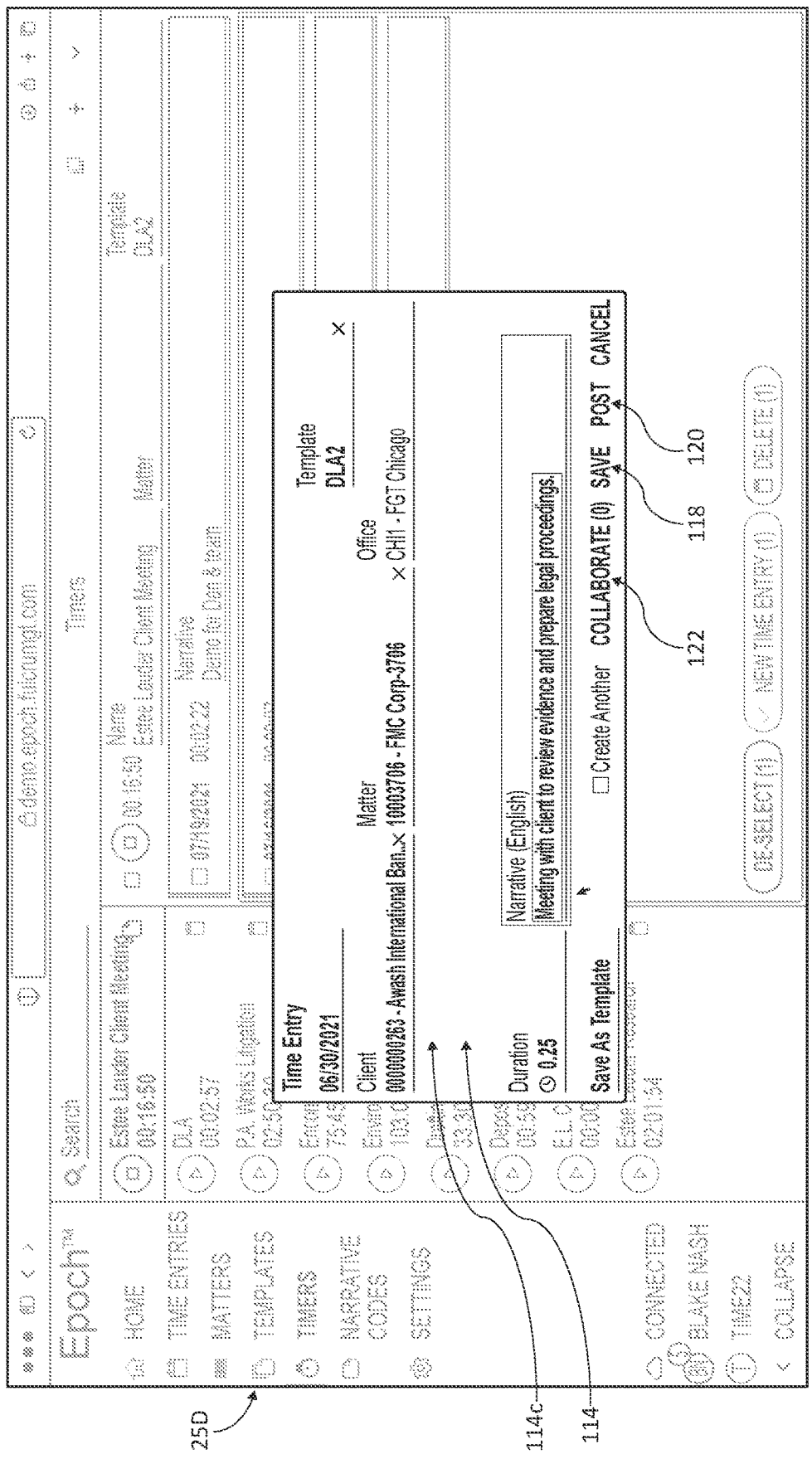

FIG. 6 illustrates an example embodiment of a fourth GUI 25D displayed on a user terminal 14 (e.g., a first user terminal 14a) for a user U (e.g., a first user $U_1$) in accordance with the present disclosure. The fourth GUI 25D displays a third view 114c of an editable time entry 114. In the third view 114c, the date and duration have been automatically populated by the system 10 based on when the running timer 108 was used by the user U to generate the editable time entry 114. In the illustrated embodiment, the duration is rounded as set by the system 10 for this particular second party $P_2$ (here, to the nearest 0.25 hour). In an embodiment, the system 10 sets how the duration is rounded based on the template (e.g., DLA2). The user U can enter various information into the third view 114c, for example, the client number, the matter number, the office, a template and a narrative. When the user U selects the save button 118, the time entry data corresponding to the editable time entry 114 is stored in the central memory 22. When the user U selects the post button 120, the time entry data corresponding to the editable time entry 114 is stored in the central memory 22 and the editable time entry becomes a posted time entry 112 and can no longer be edited. The third view 114c further includes a collaborative function button 122 which is described in more detail below.

Figure 7:
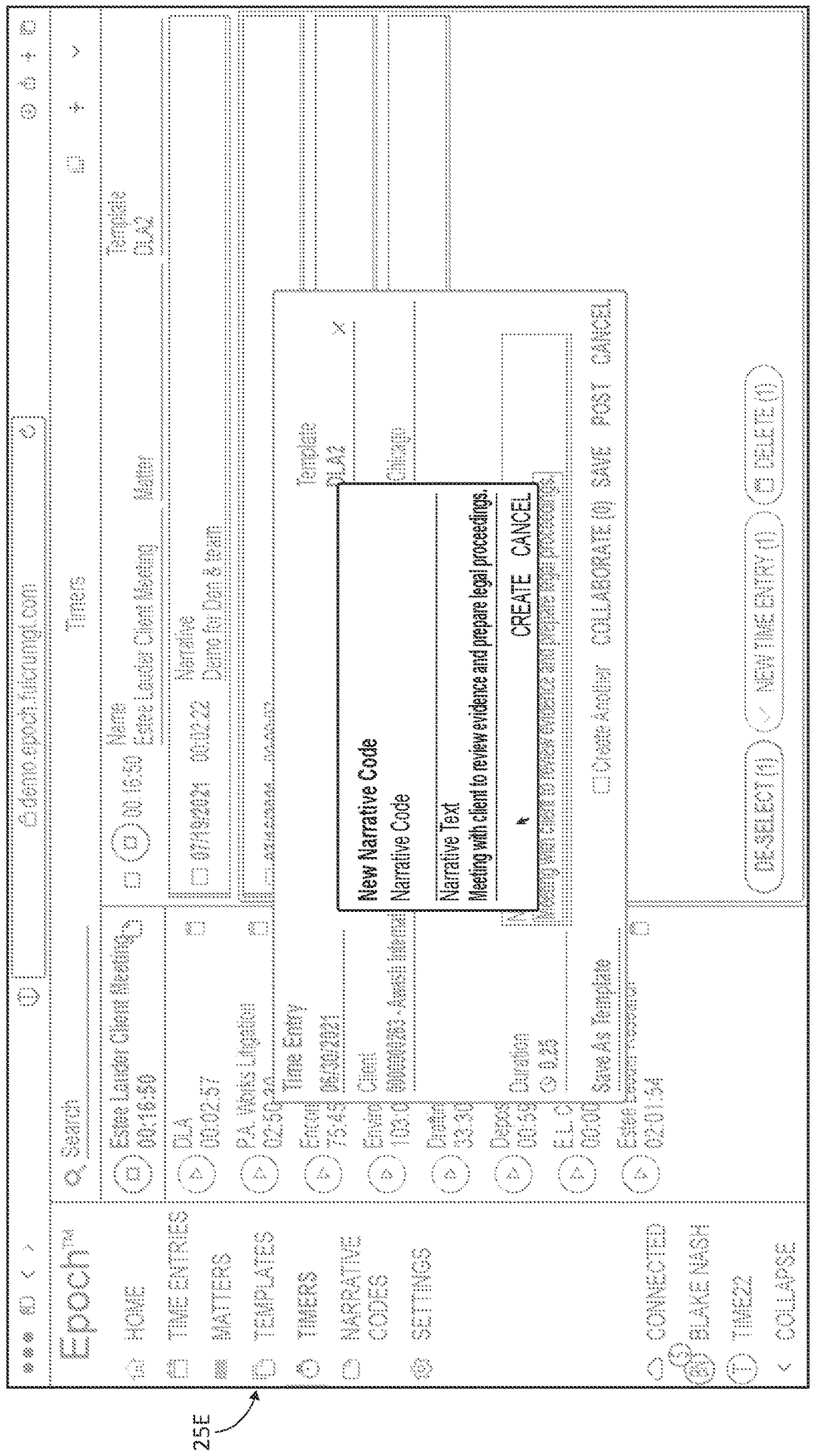

FIG. 7 illustrates an example embodiment of a fifth GUI 25E displayed on a user terminal 14 (e.g., a first user terminal 14a) for a user U (e.g., a first user $U_1$) in accordance with the present disclosure. In an embodiment, the system 10 automatically triggers the fifth GUI 25E when the user U enters a narrative in the fourth GUI 25D. The system 10 further enables the user U to enter a narrative code for the narrative. The narrative code corresponds to saved time entry data stored in the central memory 22. When the user U enters a narrative code, the system 10 retrieves the saved time entry data corresponding to the narrative code and automatically populates the narrative. In an embodiment, the system 10 links the editable time entry 114 to the saved time entry data corresponding to the narrative code. In this way, the system 10 is configured to conserve memory space. In an embodiment, the system 10 enables the user U to save a new narrative code corresponding to an entered narrative using the fifth GUI 25E. In this way, the system 10 prepares for future narrative codes for future time entries to be linked to the present time entry data corresponding to the present narrative code. Then, during subsequent time entries, the user U can enter the narrative code into the editable time entry 114 to link to and/or automatically generate the narrative. In an embodiment, the central memory 22 stores the narrative and its corresponding narrative code, such that future time entries require less data storage because full narratives do not need to be repeatedly stored. This further prevents mistakes and inconsistencies in later time entries. In various embodiments, narrative codes can also be created using other GUI 25's.

Figure 8:
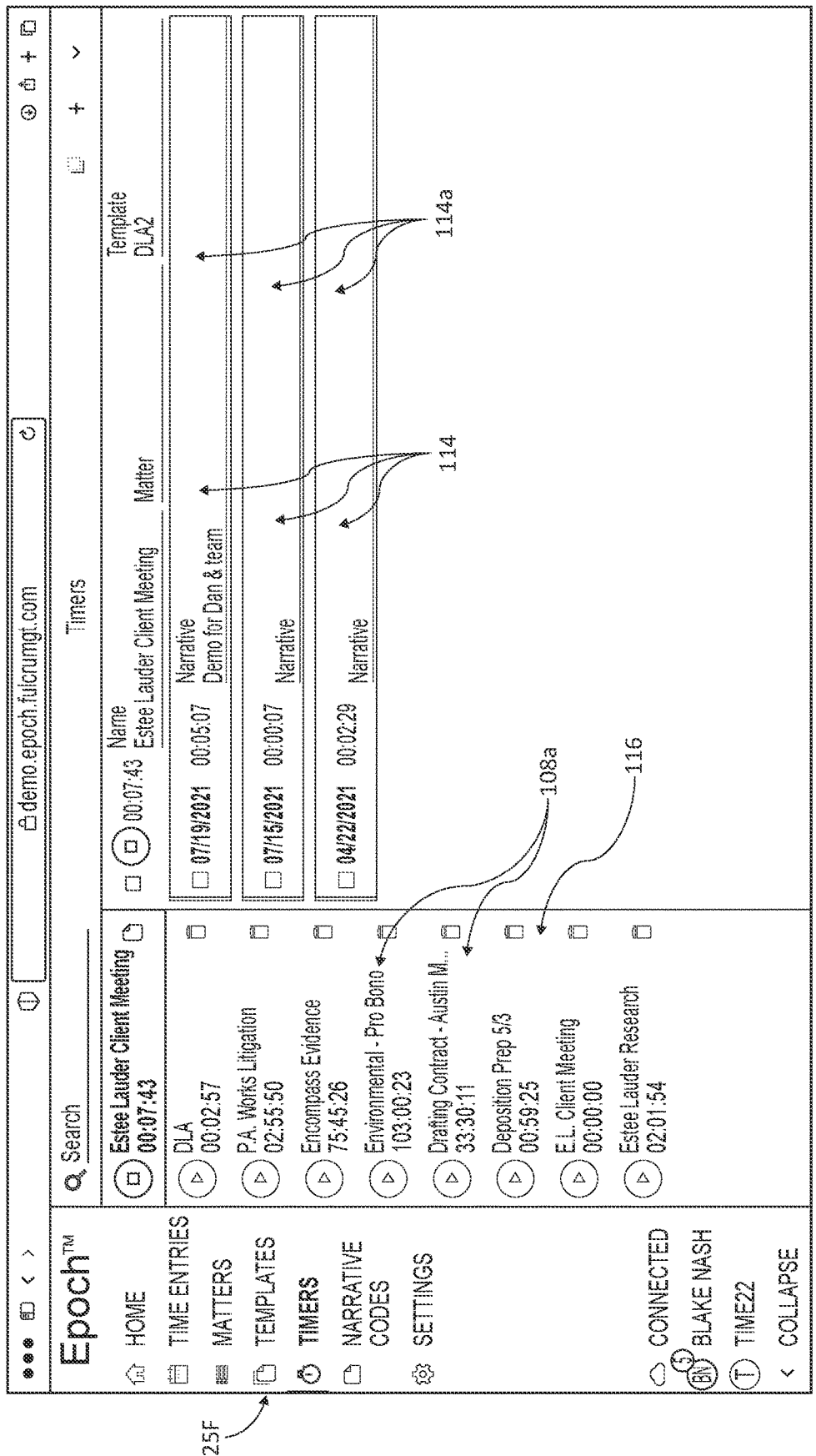

FIG. 8 illustrates an example embodiment of a sixth GUI 25F displayed on a user terminal 14 (e.g., a first user terminal 14a) for a user U (e.g., a first user $U_1$) in accordance with the present disclosure. As illustrated, the sixth GUI 25F is similar to the third GUI 25C. However, any editable time entries 114 which have been edited and finalized via the fourth GUI 25D and the fifth GUI 25E has been deleted to conserve memory space. In an embodiment, the edits from the editable time entry 114 are stored as an audit entry within the system 10, with the audit entry requiring less memory space than the time entry data for the editable time entry 114 which was previously displayed on the GUI 25 and/or stored in the central memory 22. In this way, the system 10 conserves memory space as time entries 112 are created.

Figure 9:
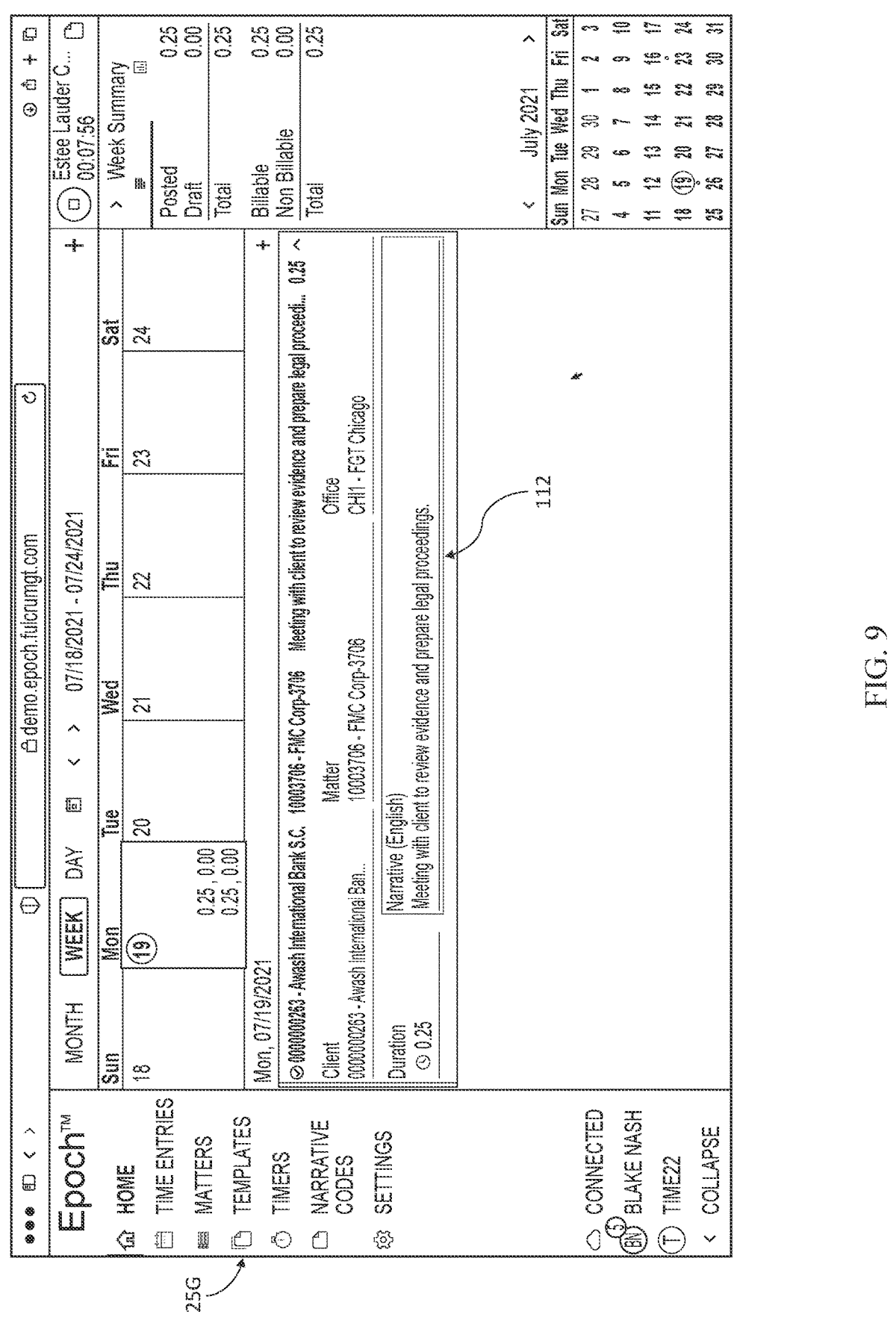

FIG. 9 illustrates an example embodiment of a seventh GUI 25G displayed on a user terminal 14 (e.g., a first user terminal 14a) for a user U (e.g., a first user $U_1$) in accordance with the present disclosure. Here, the time entry 112 is displayed on the same GUI as the weekly view. In an embodiment, an editable time entry 114 is displayed on both of the third GUI 25C and the seventh GUI 25G, but is then deleted from the third GUI 25C upon posting to conserve memory space.

Figure 10:
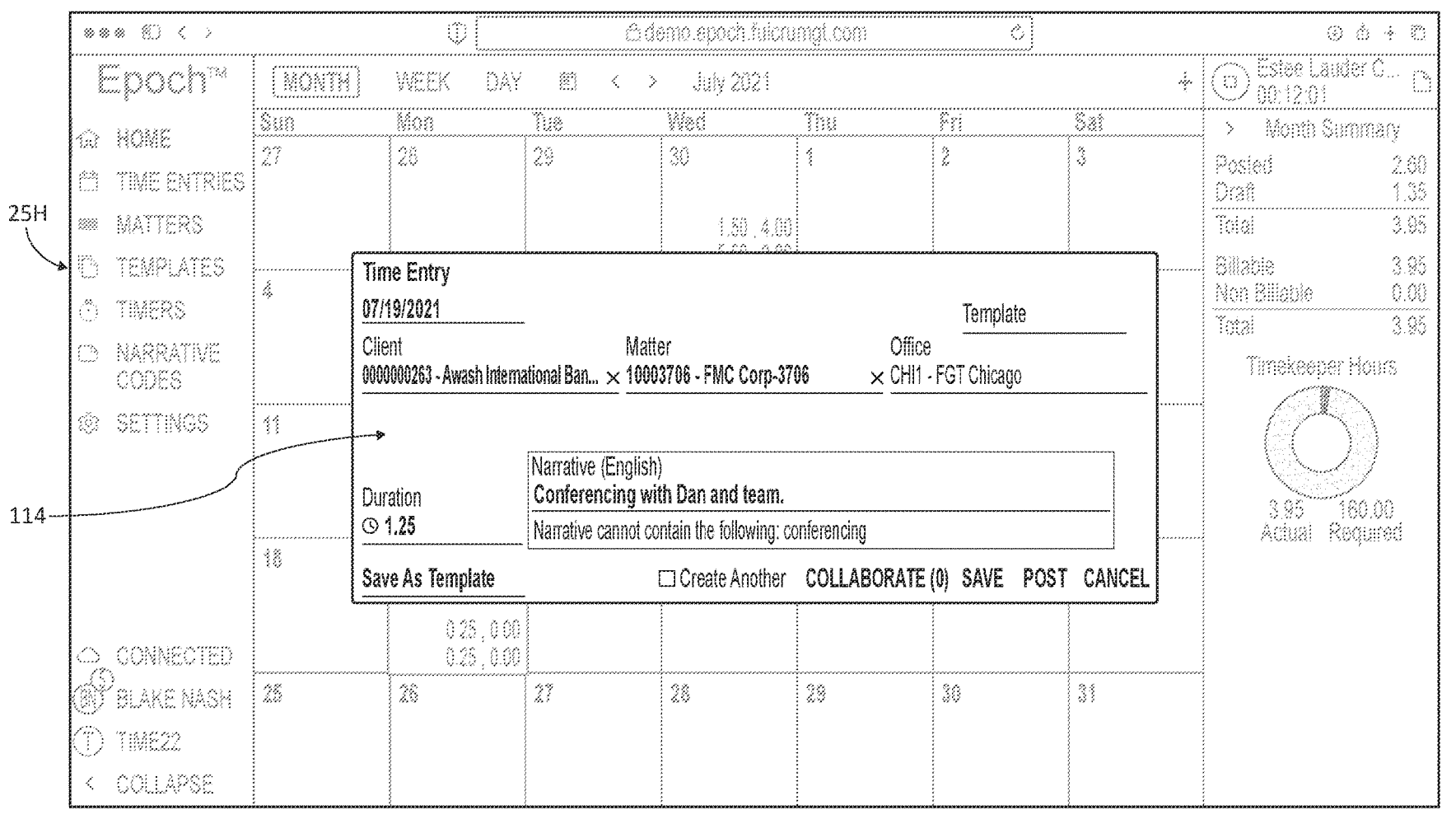

FIG. 10 illustrates an example embodiment of an eighth GUI 25H displayed on a user terminal 14 (e.g., a first user terminal 14a) for a user U (e.g., a first user $U_1$) in accordance with the present disclosure. In an embodiment, the system 10 is programmed to prevent certain words from being used in the editable time entries 112. In this example embodiment, "conferencing" is a word that the system 10 has prohibited (e.g., overall or for a specific second party $P_2$). Since the user U has used the prohibited word in a narrative, the system 10 has highlighted the narrative and informed the user U of the prohibited word. The system 10 will not allow the editable time entry 114 to be posted and/or saved until the word is removed. By preventing the editable time entries 114 from being saved with prohibited words, the system 10 conserves memory space which would otherwise be taken up by unusable time entry data. The system 10 also prevents improper data from flowing downstream, therefore conserving processing power and reducing the manual effort that would later be required to revise, manipulate or otherwise adjust the time entry data to properly adhere to client conditions as set forth in terms of engagement, thus creating better realization on bills. The system 10 thus streamlines processing, conserves memory space, and improves the accuracy of the output.

Figure 11:
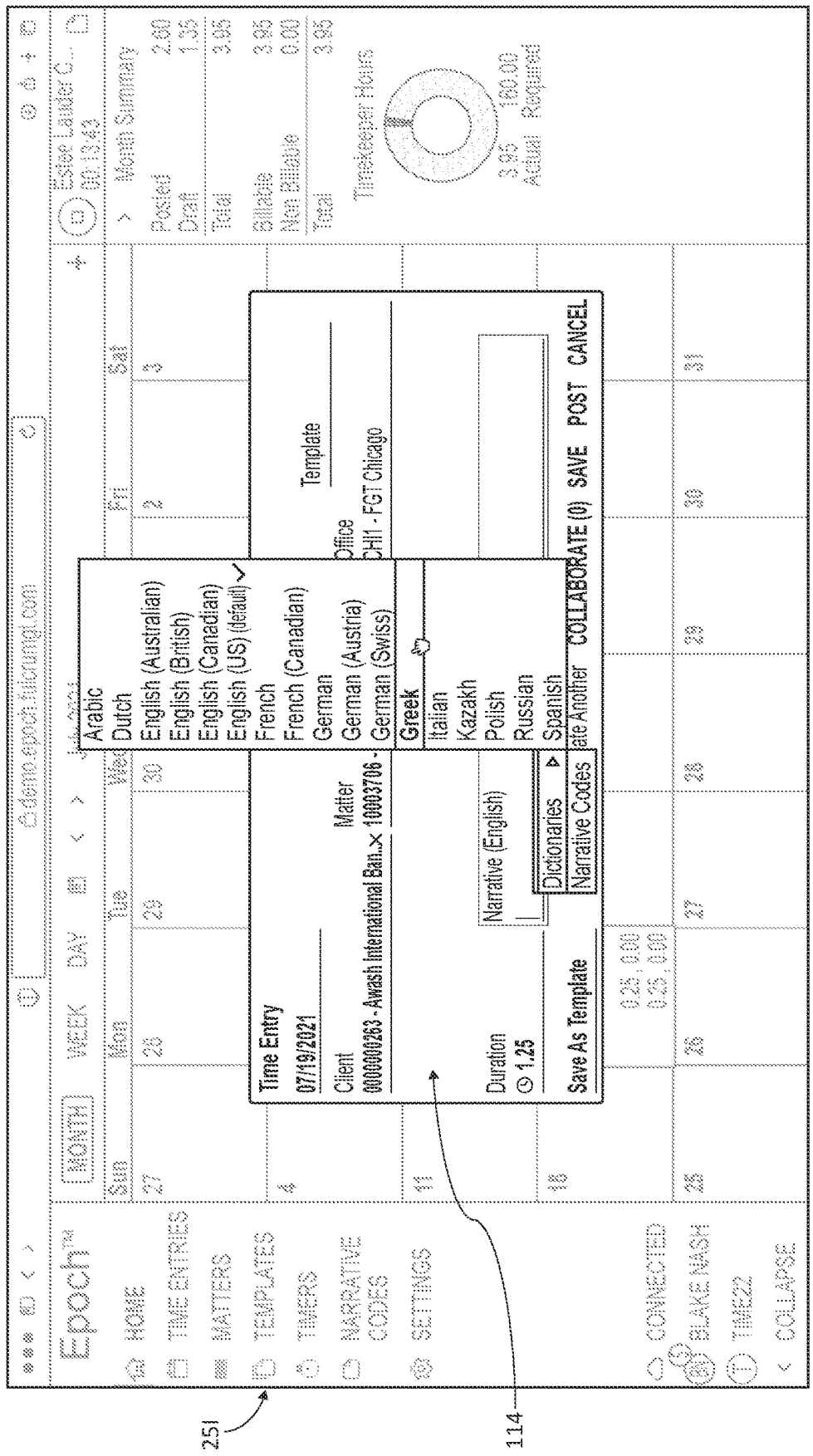

FIG. 11 illustrates an example embodiment of a ninth GUI 25I displayed on a user terminal 14 (e.g., a first user terminal 14a) for a user U (e.g., a first user $U_1$) in accordance with the present disclosure. In the illustrated embodiment, the system 10 is configured to adjust the language of the narrative when the user U clicks on the narrative and selects a new language. The system 10 is further configured to automatically enter a narrative when a narrative code (e.g., the narrative code saved in the central memory 22 at the fifth GUI 25E) is entered. In an embodiment, the system 10 is further configured to link the editable time entry 114 to existing time entry data stored in the central memory 22 when the user U selects a particular narrative code. In this way, the system 10 conserves memory space that would otherwise be taken by duplicate or near-duplicate time entries.

Figure 12:
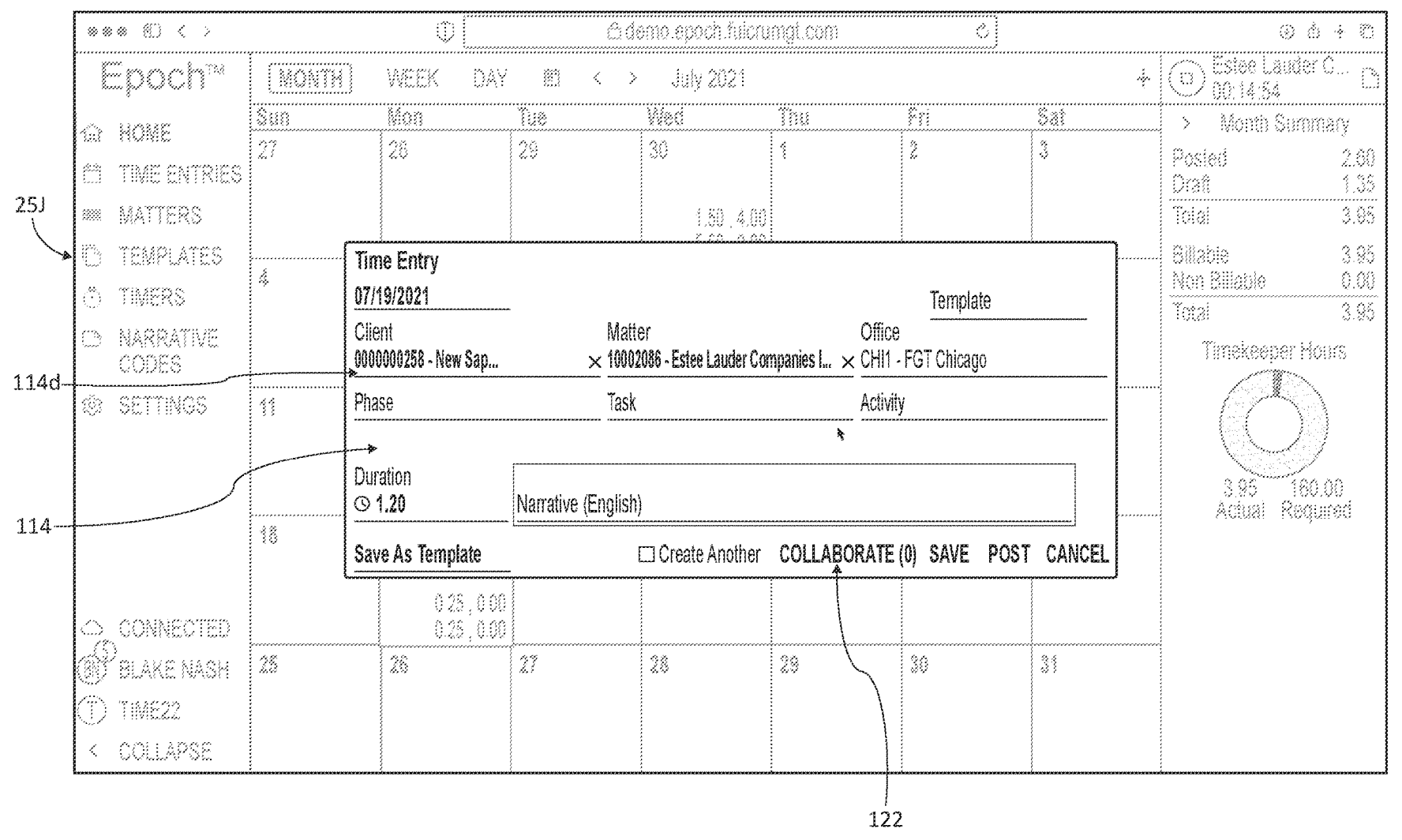

FIG. 12 illustrates an example embodiment of a tenth GUI 25J displayed on a user terminal 14 (e.g., a first user terminal 14a) for a user U (e.g., a first user $U_1$) in accordance with the present disclosure. The tenth GUI 25J displays a fourth view 114d of an editable time entry 114. In the fourth view 114, phase, task and activity have been included in comparison to the third view 114c of the fourth GUI 25D. The user U can therefore enter various additional information, for example, the client, the matter, the office, the phase, the task, the activity, a template and a narrative. The fourth view 114d further includes the collaborative function button 122.

Figure 13:
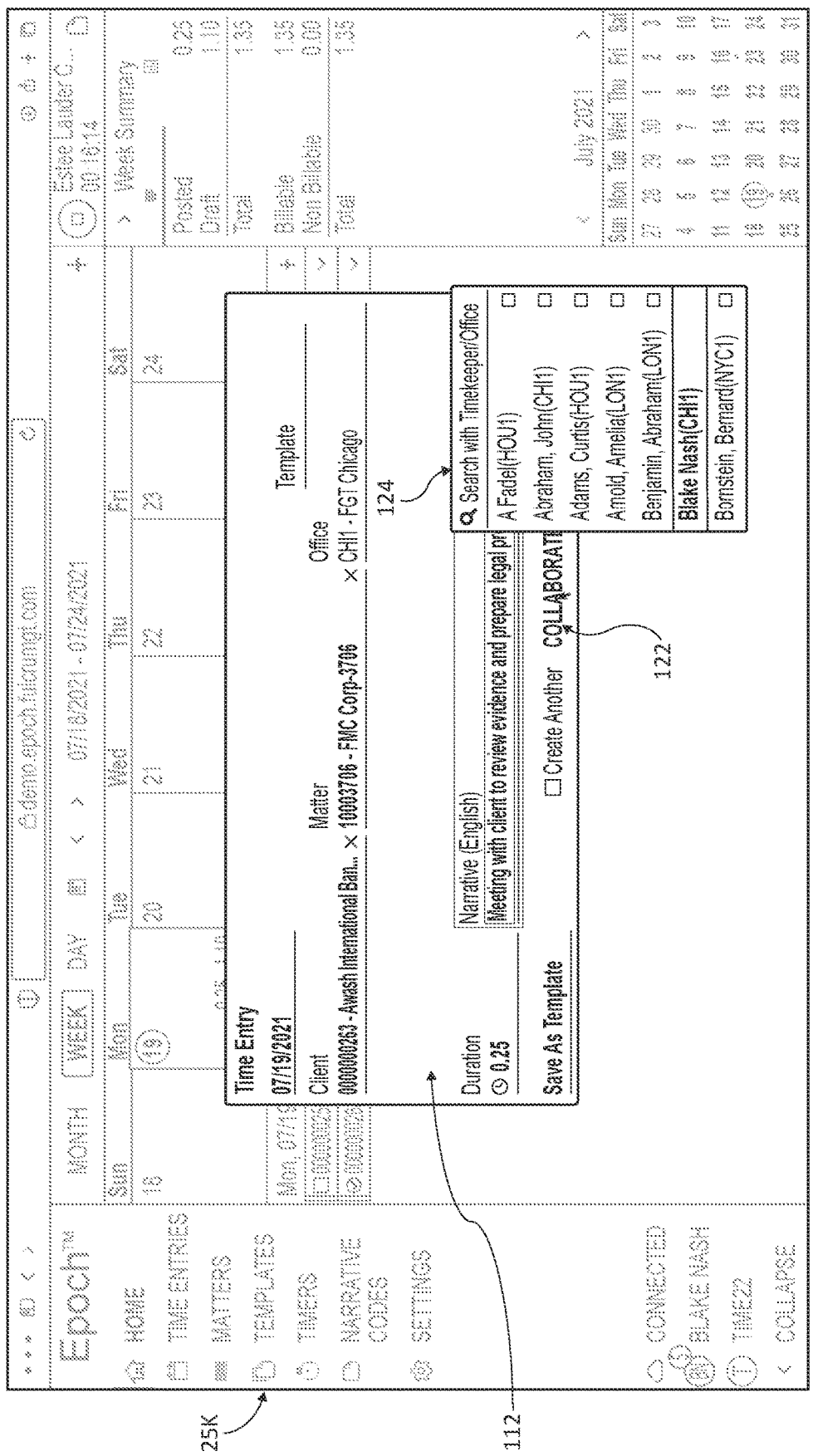

FIG. 13 illustrates an example embodiment of an eleventh GUI 25K displayed on a user terminal 14 (e.g., a first user terminal 14a) for a user U (e.g., a first user $U_1$) in accordance with the present disclosure. The eleventh GUI 25K illustrates an example embodiment of the collaborative function. In the illustrated embodiment, the collaborative function is triggered when the user U selects the collaborative function button 122 in an editable time entry 114. In an embodiment, the collaborative function streamlines processing and conserves memory space by using a single editable time entry 114 for multiple timekeepers. More specifically, the collaborative function uses a single editable time entry 114 to generate editable time entries 114 for multiple timekeepers and/or link corresponding time entry data stored within the central memory 22.

In the illustrated embodiment, selecting the collaborative function button 122 causes the generation of a list 124 of a plurality of users U (e.g., a second user $U_2$ who controls the second user terminal 14b, an nth user $U_n$ who controls the nth user terminal 14n, etc.). The first user $U_1$ who is currently utilizing the collaborative function is enabled to select one or more additional users U from the list 124. In an embodiment, the first user $U_1$ selects each additional user U who was involved in a project relating to the editable time entry 114 being linked using the collaborative function. For example, in the illustrated embodiment, the narrative is "Meeting with client to review evidence and prepare legal proceedings." The first user $U_1$ therefore uses the collaborative function to select each additional user U who was involved in this meeting. On a practical level, this saves time for the additional users U and prevents errors and inconsistencies in work-in-progress reports and/or billing reports by ensuring that the time and/or narrative recorded for each user U in the meeting is the same. On a computer component level, this streamlines computer processing and conserves memory space by using a single editable time entry 114 for multiple timekeepers.

Thus, in an embodiment, the eleventh GUI 25K enables a first user $U_1$ to use a first user terminal 14a to link a first time entry 112, 114 to a second user $U_2$. Upon creation of the first time entry 112, 114 by the first user $U_1$ using the first user terminal 14a, the central memory 22 stores at least a portion of the time entry data from the first time entry 112, 114. The portion of the time entry can include at least time entry data associated with a client number, a matter number, a day, a time value, and/or a narrative. The central processor 20 also causes the creation of a second time entry 112, 114 on a second GUI 25 on a second user terminal 14b as described herein. The second user terminal 14b is controlled by a second user $U_2$ selected by the first user $U_1$ on the first user terminal 14a using the collaborative function as described herein. The central processor 20 can also cause the creation of additional time entries 112, 114 on additional GUIs on additional user terminals 14n for users U selected by the first user $U_1$. The second time entry 112, 114 includes at least the portion of the time entry data from the first time entry 112, 114. In an embodiment, the second time entry 112, 114 duplicates the portion of the time entry data from the first time entry 112, 114. The duplicate portion of the time entry data can also be stored in the central memory 22. This conserves processing power because there is no need for the system 10 to process all of the same data creation steps for the second user $U_2$ to generate the second time entry 112, 114 as was needed for the first user $U_1$ to generate the first time entry 112, 114. In an embodiment, the central processor 20 is programmed to cause the central memory 22 to delete at least part of the portion of the time entry data stored in the central memory 22 after the posting of the second time entry 112, 114 by the second user $U_2$ via the second GUI 25 of the second user terminal 14b. In an embodiment, the central processor 20 further links both the first time entry 112, 114 and the second time entry 112, 114 to the portion of the time entry data stored in the central memory 22. In this way, use of the central processor 20 is streamlined and memory on the central memory 22 is conserved. The system 10 is then configured to use both the first time entry 112, 114 and the second time entry 112, 114 when generating a report such as a work-in-progress report or a billing report. In an embodiment, the system 10 generates the report by retrieving time entry data which is linked to the first time entry 112, 114 and the second time entry 112, 114.

In an embodiment, the central processor 20 is programmed to cause the central memory 22 to store distinct time entry data for both the first time entry 112, 114 and the second time entry 112, 114. In an embodiment, the central processor 20 is further programmed to link the distinct time entry data. In this way, use of the central processor 20 is streamlined and memory on the central memory 22 is conserved when generating a report such as a work-in-progress report or a billing report. In an embodiment, the report is generated by retrieving the linked data.

Figure 14:
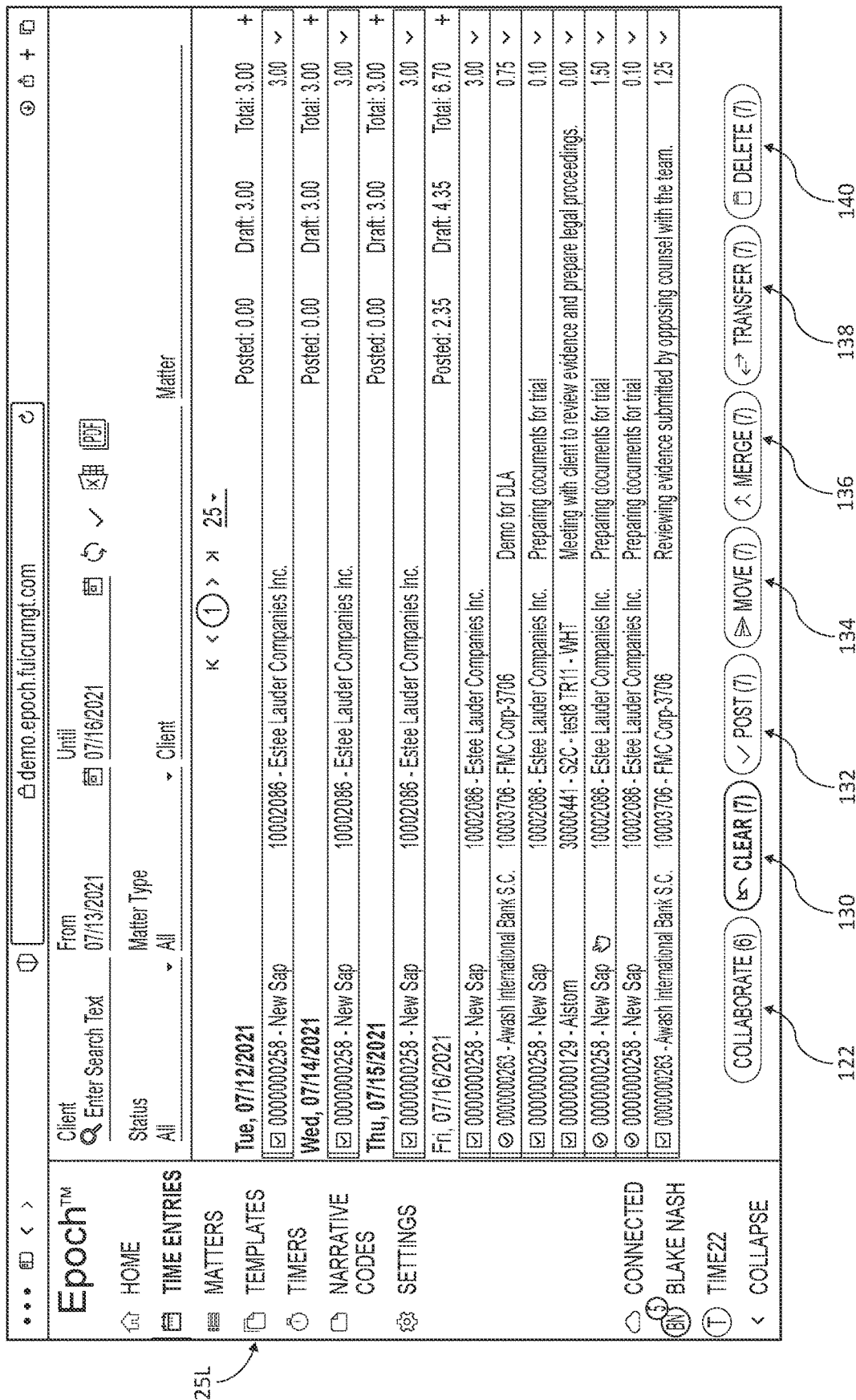

FIG. 14 illustrates an example embodiment of a twelfth GUI 25L displayed on a user terminal 14 (e.g., a first user terminal 14a) for a user U (e.g., a first user $U_1$) in accordance with the present disclosure. The twelfth GUI 25L provides a listing of editable time entries 114 and/or posted time entries 112. The twelfth GUI 25L further provides a collaborative function button 122, a clear button 130, a post button 132, a move button 134, a merge button 136, a transfer button 138, and a delete button 140. The user U can use multiple of these buttons on a time entry 112, 114 to adjust time entries and conserve memory space.

The collaborative function button 122 is enabled to trigger the collaborative function as described herein. By providing the collaborative function button 122 on the twelfth GUI 25L, the system 10 further enables the first user $U_1$ to implement the collaborative function after exiting the eleventh GUI 25K and generating the time entries 112, 114 shown in the twelfth GUI 25L. The clear button 130 triggers clearing of selected time entries from the twelfth GUI 25L. The post button 132 causes one or more editable time entry 114 to be finalized for including on a billing report. The merge button 136 enables the combination of multiple time entries 112, 114. The transfer button 138 enables editable time entries to be transferred, for example, to different client or matter numbers. The delete button causes the deletion of time entry data corresponding to a time entry 112, 114 from the central memory 22.

In an embodiment, the merge button 136 is configured to combine multiple time entries 112, 114. For example, a user U can select multiple time entries 112, 114 (e.g., a first time entry 112, 114 and a second time entry 112, 114) using the twelfth GUI 25L and select the merge button 136. Upon selecting the merge button 136, the central processor 20 is configured to create a new time entry 112, 114 which includes one or both of the narratives associated with the first time entry 112, 114 and the second time entry 112, 114. The central processor 20 is further configured to delete time entry data related to each of the individual first time entry 112, 114 and the second time entry 112, 114, thus conserving memory space by storing reduced time entry data corresponding to the new time entry from the combination.

In an embodiment, the user U is enabled to use any of the buttons 122, 130, 132, 134, 136, 138, 140 in combination. For example, the user U can first merge time entries using the merge button 136 and then use the collaborative function button 122 to link the newly merged time entry 112, 114 to other users U. In this way, the system 10 enables the ongoing reduction of memory space associated with excess time entries 112, 114 and conserves processing power associated with management of those time entries 112, 114.

Figure 15:
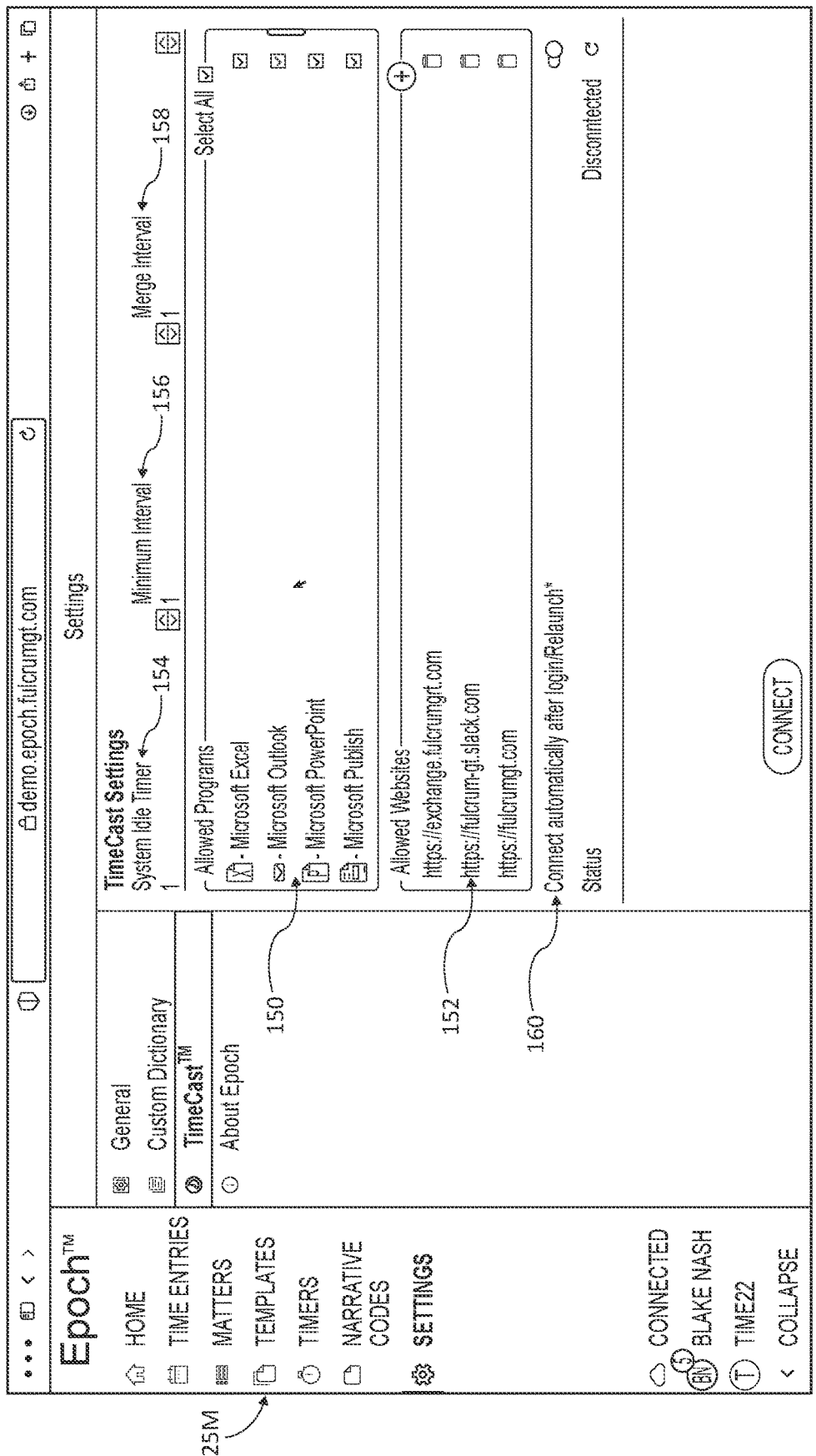

FIG. 15 illustrates an example embodiment of a thirteenth GUI 25M displayed on a user terminal 14 (e.g., a first user terminal 14a) for a user U (e.g., a first user $U_1$) in accordance with the present disclosure. In an embodiment, the thirteenth GUI 25M coordinates with the running timer 108 discussed herein. In the illustrated embodiment, the thirteenth GUI 25M includes a program enablement panel 150 and a website enablement panel 152. The program enablement panel 150 enables the user U to enable certain external computer programs (e.g., word, excel, powerpoint, publish, etc.) to be linked to the system 10, for example, via an executable path. The website enablement panel 152 enables the user U to enable certain external websites to be linked to the system 10.

When an external computer program has been linked by the program enablement panel 150, the running timer 108 begins to run when that external computer program is opened on the user U's desktop. The running timer 108 records time until a predetermined condition has been reached. The predetermined condition can include, for example, the external computer program being closed on the desktop, the external computer program being minimized on the desktop, the user U being idle within the external computer program for a predetermined amount of time, or other predetermined conditions. In an embodiment, the running timer 108 is programmed to record time until any one of a plurality of predetermined conditions is reached. The system 10 then automatically generates an editable time entry 114 when a predetermined condition has been reached.

In the illustrated embodiment, one or more predetermined condition can be set by the system 10 using the thirteenth GUI 25M, for example, using a system idle timer variable 154, a minimum interval variable 156, a merge interval variable 158, and/or another variable. In an embodiment, the system idle timer variable 154 sets an idle time (e.g., 1 min) which triggers the generation of an editable time entry 114 for the amount of time preceding the idle detection. For example, the running timer 108 begins to run when the user U opens an external computer program and stops after detection of the amount of idle time. This detection of idle time further triggers the system 10 to generate an editable time entry 114 including the overall detected time (e.g., minus the idle time). In an embodiment, the minimum interval variable 156 sets an interval time (e.g., 1 min) which triggers the generation of an editable time entry 114 for the amount of time preceding the interval time. For example, the running timer 108 begins to run when the user U opens an external computer program and stops after detection of an interval time in which the user is using other programs. This detection of idle time further triggers the system 10 to generate an editable time entry 114 including the overall detected time (e.g., minus the interval time). In an embodiment, the merge interval variable 158 causes the system 10 merge the times recorded by subsequent running timers 108 which have been recorded within the merge interval. Then, the system merges multiple running timers 108 to create a single editable time entry 114 with the additional times.

When a website has been linked by the website enablement panel 152, the running timer 108 begins to run when that website is opened on the user U's desktop. The running timer 108 records time until a predetermined condition has been reached. The predetermined condition can include, for example, the website being closed on the desktop, the website being minimized on the desktop, the user U being idle within the website for a predetermined amount of time, or other predetermined conditions. In an embodiment, the running timer 108 is programmed to record time until any one of a plurality of predetermined conditions is reached. The system 10 then automatically generates an editable time entry 114 when a predetermined condition has been reached. In the illustrated embodiment, one or more predetermined condition can be set by the system 10 using the thirteenth GUI 25M, for example, using a system idle timer variable 154, a minimum interval variable 156, a merge interval variable 158, and/or another variable, as discussed above.

In the illustrated embodiment, the thirteenth GUI 25M further includes an automatic connect button 160. When enabled, the system 10 automatically records data and generates corresponding editable time entries 114 when enabled external computer programs and/or websites are accessed.

Figure 16:
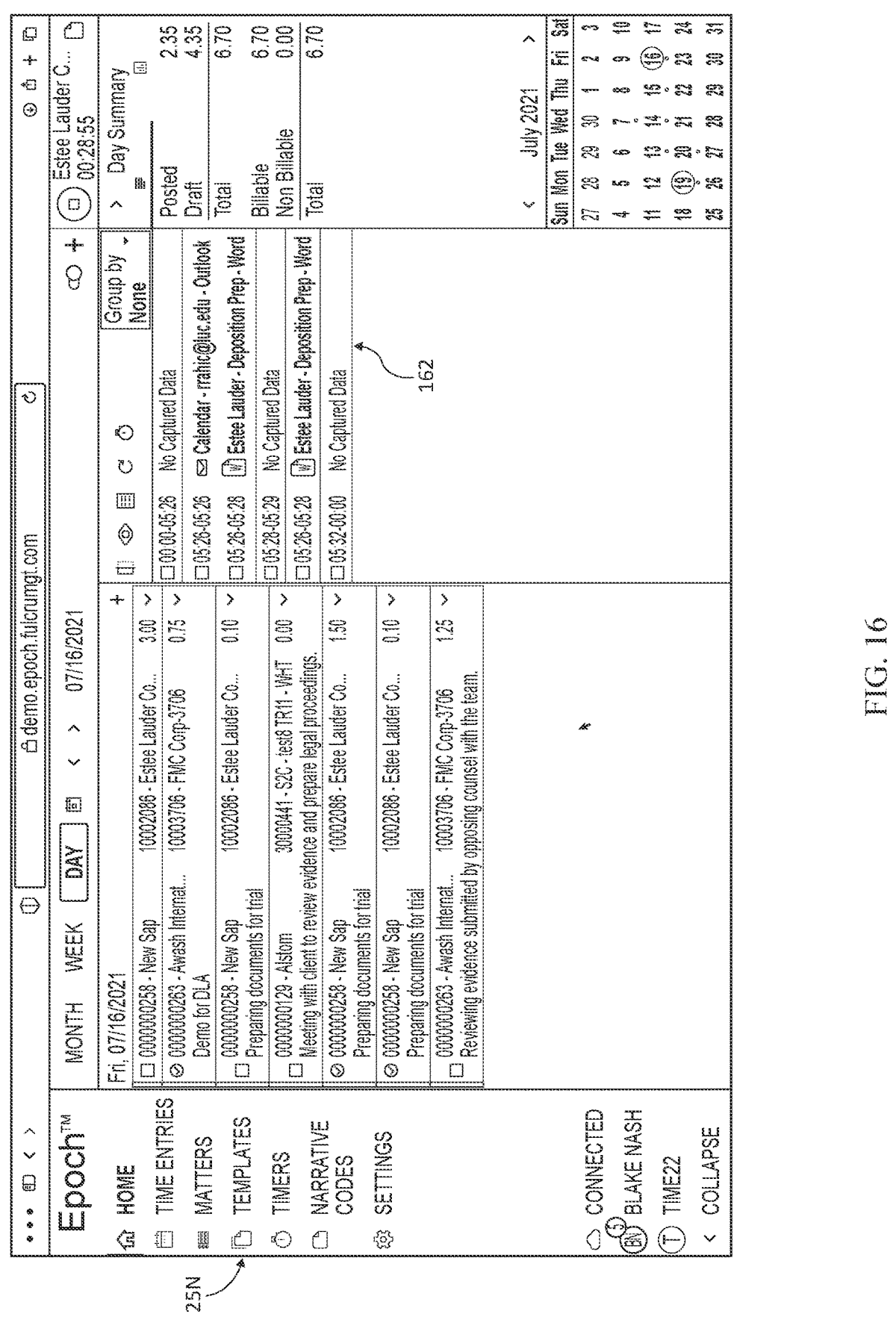

FIG. 16 illustrates an example embodiment of a fourteenth GUI 25N displayed on a user terminal 14 (e.g., a first user terminal 14a) for a user U (e.g., a first user $U_1$) in accordance with the present disclosure. In the illustrated embodiment, the fourteenth GUI 25N includes a linked time entry panel 162 which includes editable time entries 114 which were created by the system 10 based on use of an external computer program and/or website that has been enabled by the program enablement panel 150 and/or the website enablement panel 152. The user U can then select these editable time entries 114, edit, collaborate, merge, post, and/or use other features as described herein. For example, for a client meeting attended by multiple users $U_1$, $U_2 \ldots U_n$, one user U can open a linked external computer program or website during the meeting to cause the automatic generation of an editable time entry 114, and then the system 10 can generate the editable time entry 114 for the time spent using that linked external computer program or website and use the collaboration feature to expand that editable time entry 114 to multiple users U as described herein. In this way, multiple editable time entries 114 can be generated for each user U who attended the meeting simply by one user U opening an external computer program or website and using the collaborate function for the editable time entry 114 generated by the system 10.

Figure 17:
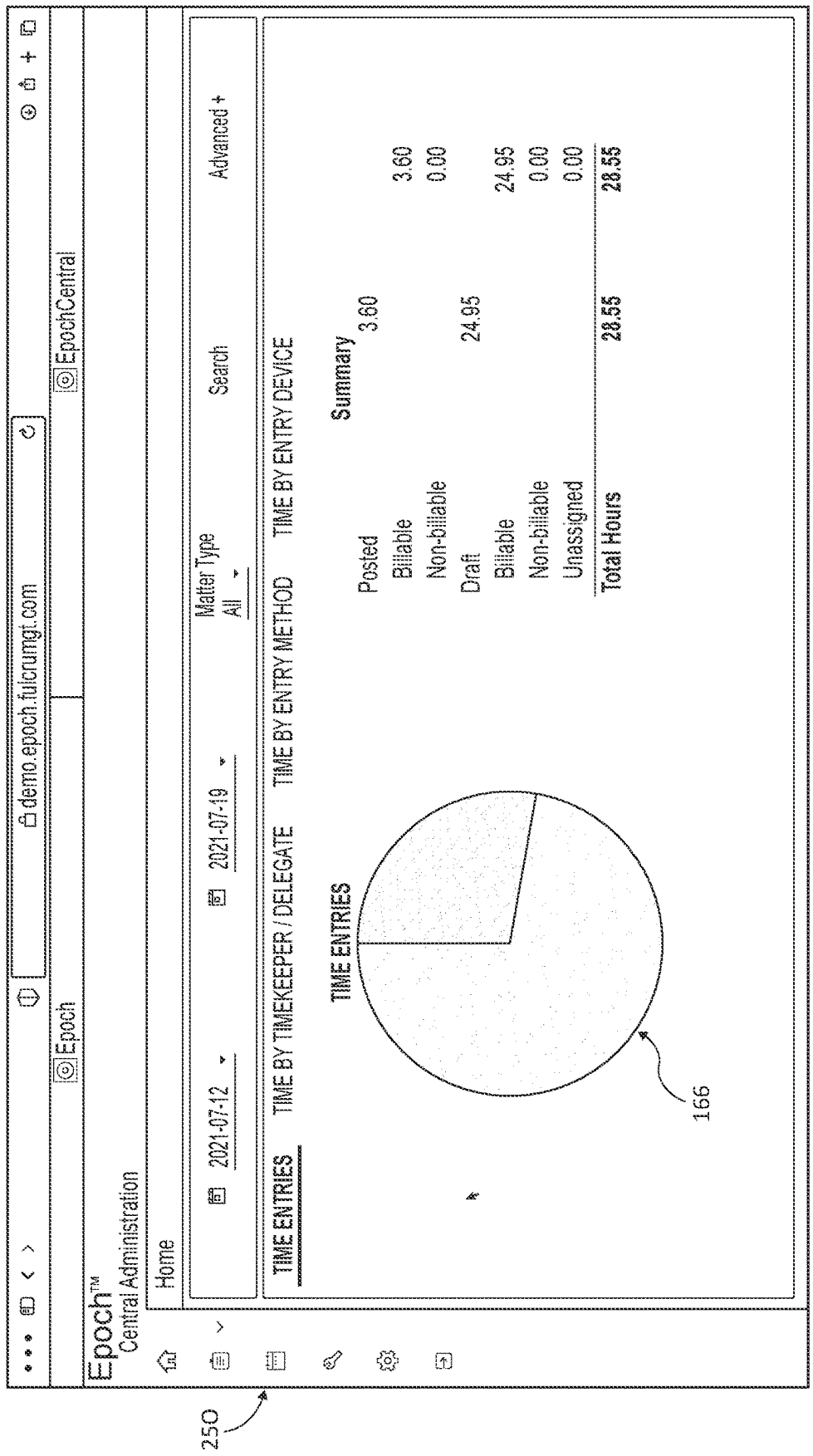

FIG. 17 illustrates an example embodiment of a fifteenth GUI 25O displayed on a user terminal 14 (e.g., a first user terminal 14a) for a user U (e.g., a first user $U_1$) in accordance with the present disclosure. The fifteenth GUI 25O is configured to illustrate a graphical representations 166 using the time entry data stored in the central memory 22. In an embodiment, the user U can click on the graphical representations 166 and see time entries which correspond to that portion (e.g., slice of the pie chart, line of a graph, etc.). In an embodiment, the user U is enabled to further edit and post editable time entries 114 using this feature.

Figure 18:
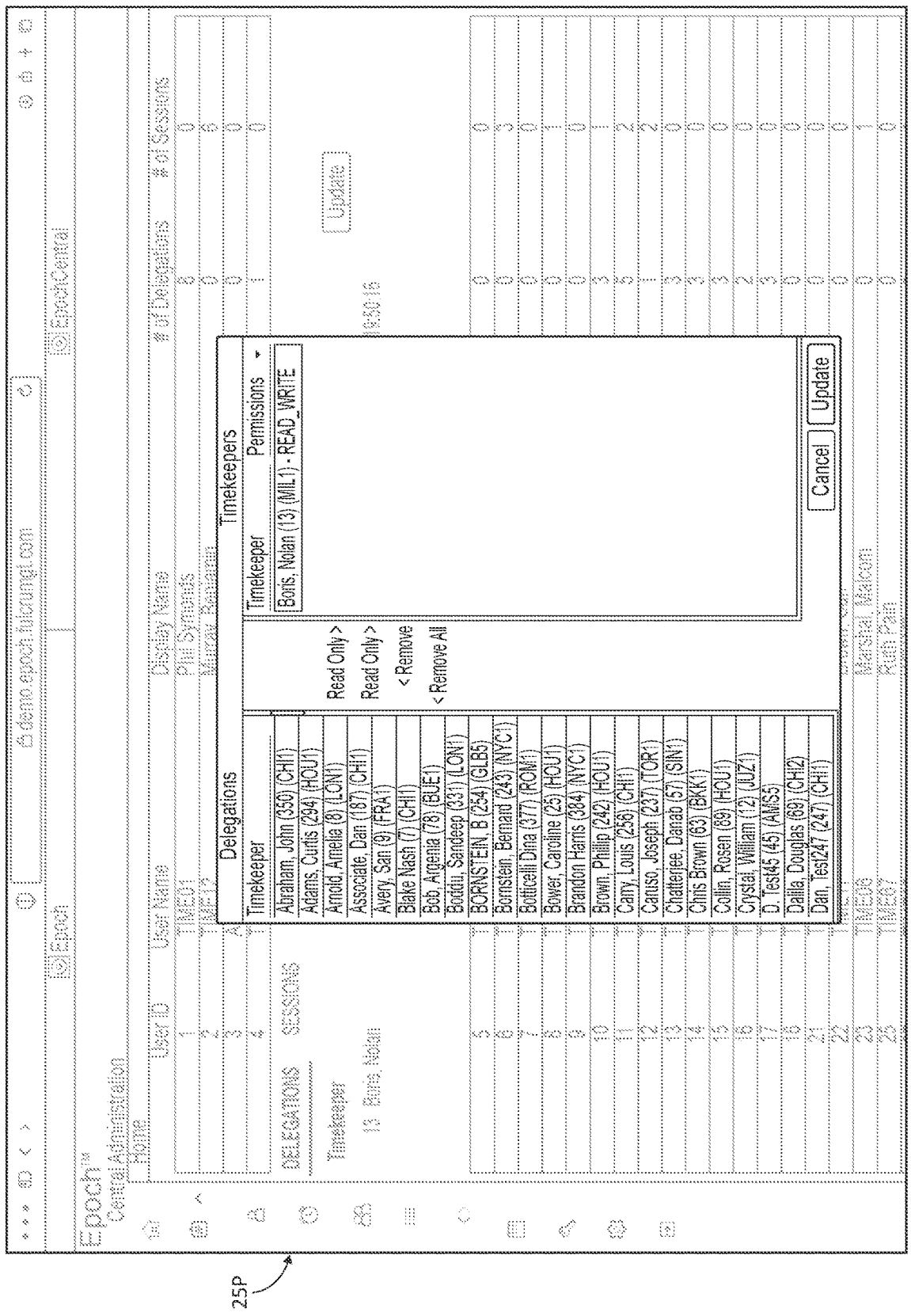

FIG. 18 illustrates an example embodiment of a sixteenth GUI 25P displayed on a user terminal 14 (e.g., a first user terminal 14a) for a user U (e.g., a first user $U_1$) in accordance with the present disclosure. The fifteenth GUI 25P links the accounts of various users U employed by the first party $P_1$. In an embodiment, if a first user $U_1$ is linked to a second user $U_2$, e.g. using the sixteenth GUI 25P, and the first user $U_1$ then creates a second time entry 112, 114 which is linked to the second user $U_2$ using the collaborative function as described herein, the second time entry 112, 114 corresponding to the second user $U_2$ is posted without requiring any involvement by the second user $U_2$ using the second terminal 14b. In an embodiment, the system 10 automatically posts the second time entry 112, 114 upon creation of the first time entry 112, 114 by the first user $U_1$ when the first user $U_1$ and the second user $U_2$ have already been linked.

Figure 19:
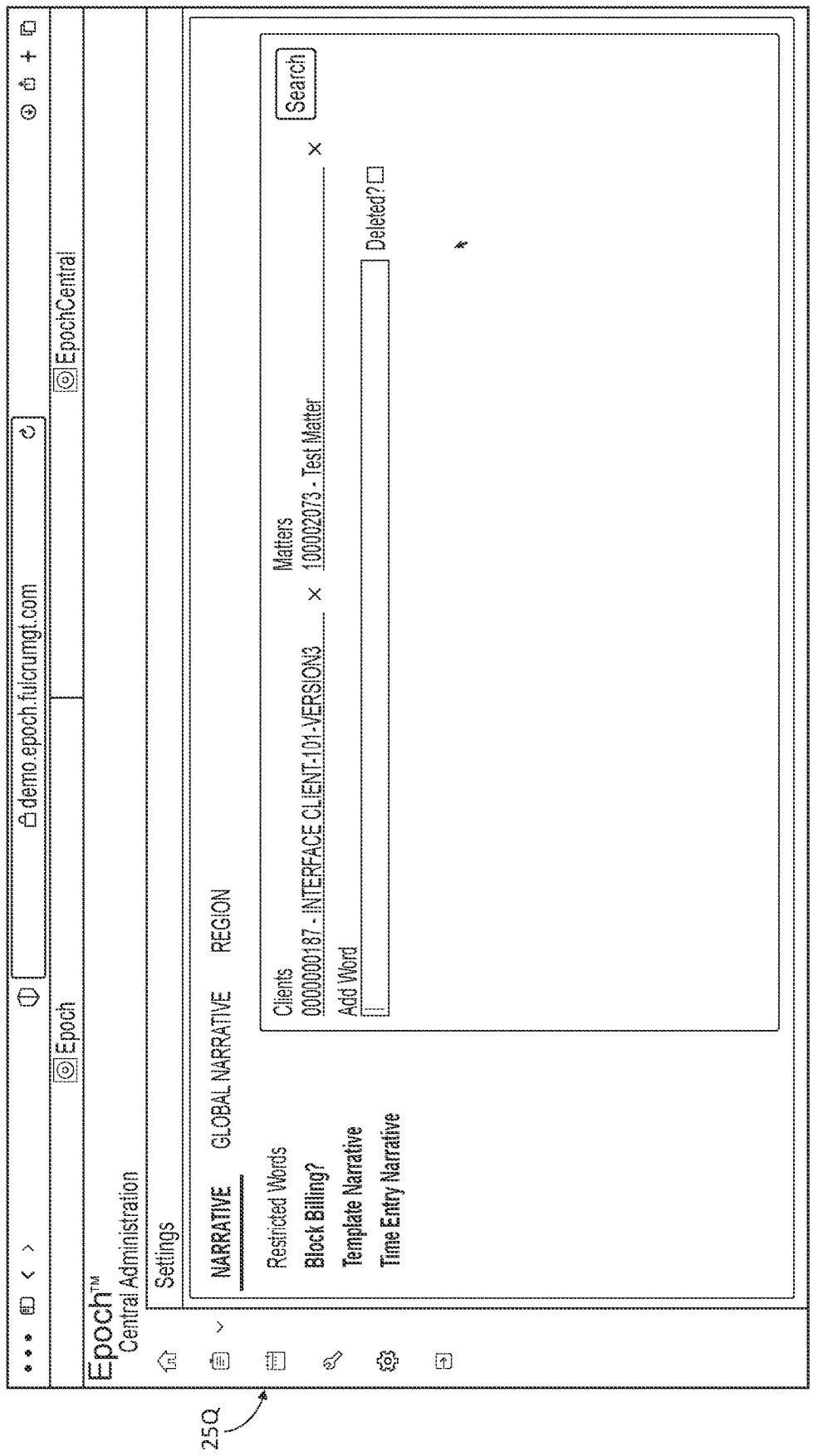

FIG. 19 illustrates an example embodiment of a seventeenth GUI 25Q displayed on a user terminal 14 (e.g., a first user terminal 14a) for a user U (e.g., a first user $U_1$) in accordance with the present disclosure. The seventeenth GUI 25Q enables a user U to set up rules for the narratives for editable time entries 114. For example, the seventeenth GUI 25Q enables the user U to enter prohibited words (e.g., as discussed herein) which the system 10 will apply for example to client or matters. The seventeenth GUI 25Q enables the user to create templates and/or set narrative codes as discussed herein.

Figure 20:
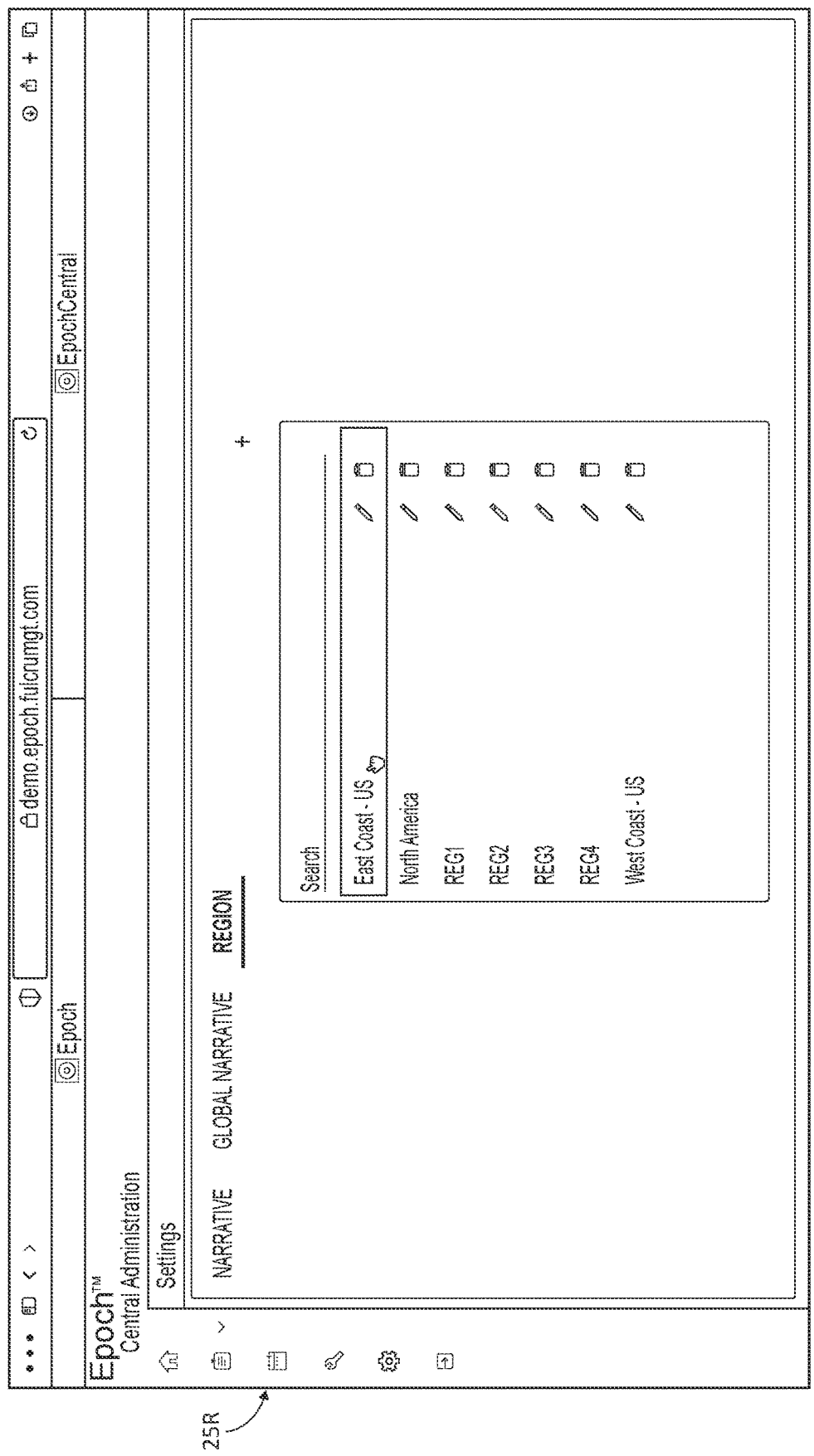

FIG. 20 illustrates an example embodiment of an eighteenth GUI 25R displayed on a user terminal 14 (e.g., a first user terminal 14a) for a user U (e.g., a first user $U_1$) in accordance with the present disclosure. The eighteenth GUI 25R enables a user U to create settings which are specific only to a certain region.

Figure 21:
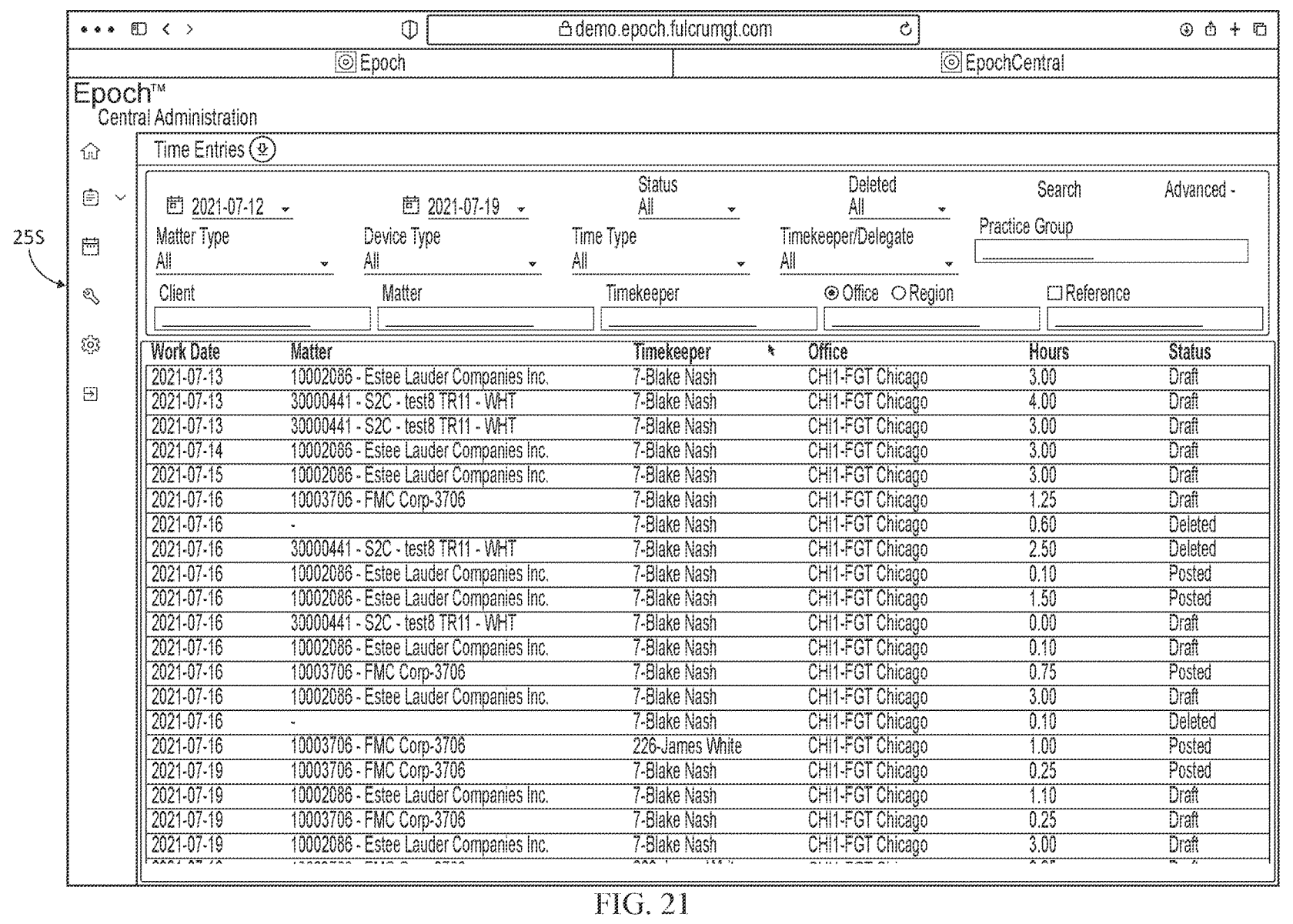

FIG. 21 illustrates an example embodiment of a nineteenth GUI 25S displayed on a user terminal 14 (e.g., a first user terminal 14a) for a user U (e.g., a first user $U_1$) in accordance with the present disclosure. The nineteenth GUI 25S displays summary data corresponding to the status of various time entries 112, 114. In an embodiment, the central controller 20 can replace a larger set of time entry data with a smaller set of summary data to conserve memory space within the central memory 22. The nineteenth GUI 25S further allows filtering of the summary data in a variety of categories.

Figure 22:
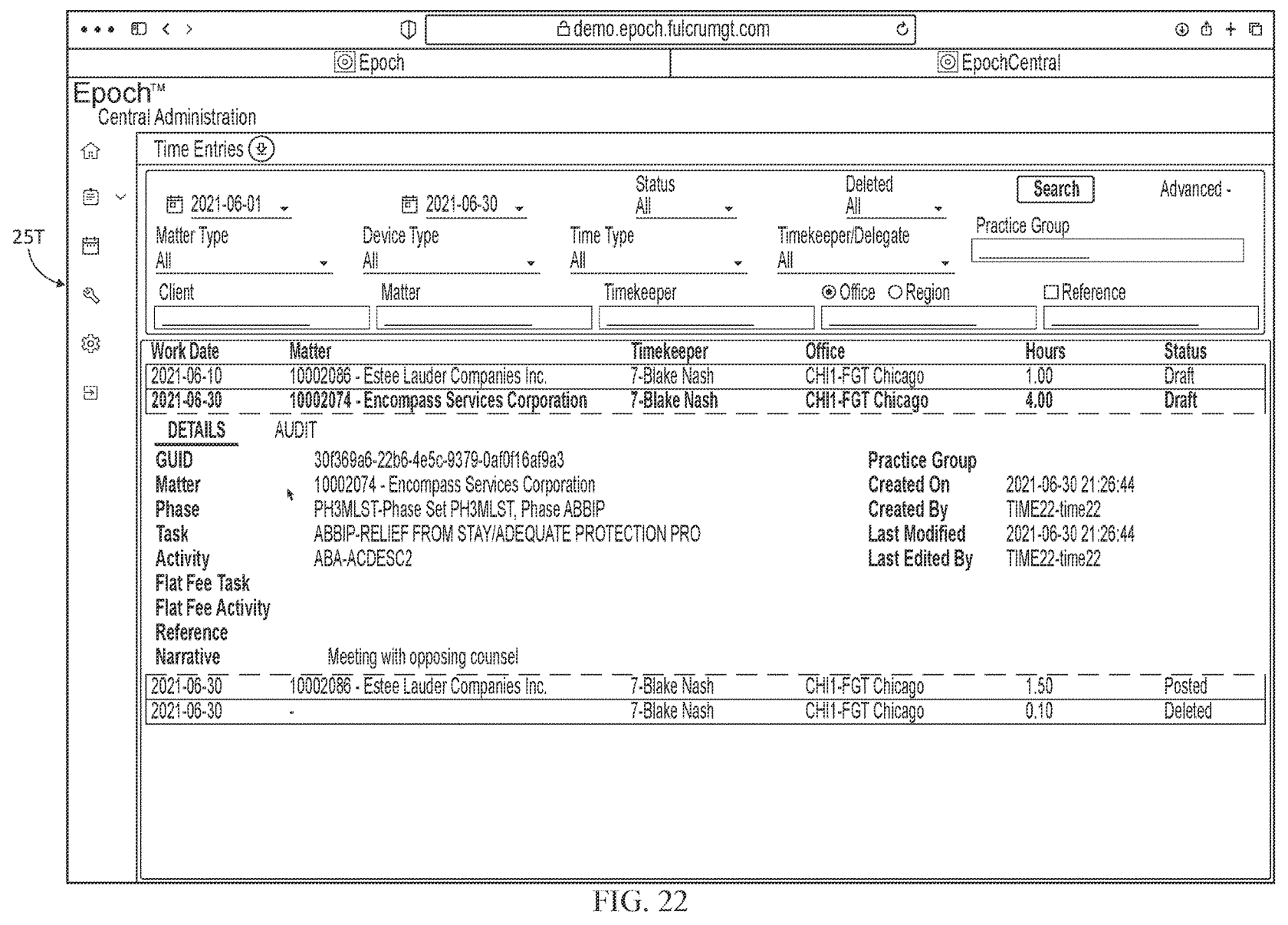

FIG. 22 illustrates an example embodiment of a twentieth GUI 25T displayed on a user terminal 14 (e.g., a first user terminal 14a) for a user U (e.g., a first user $U_1$) in accordance with the present disclosure. The twentieth GUI 25T shows more detailed data corresponding to the summary data illustrated in the nineteenth GUI 25S. In an embodiment, the central controller 20 can replace a larger set of time entry data with a smaller set of detailed summary data to conserve memory space within the central memory 22.

Figure 23:
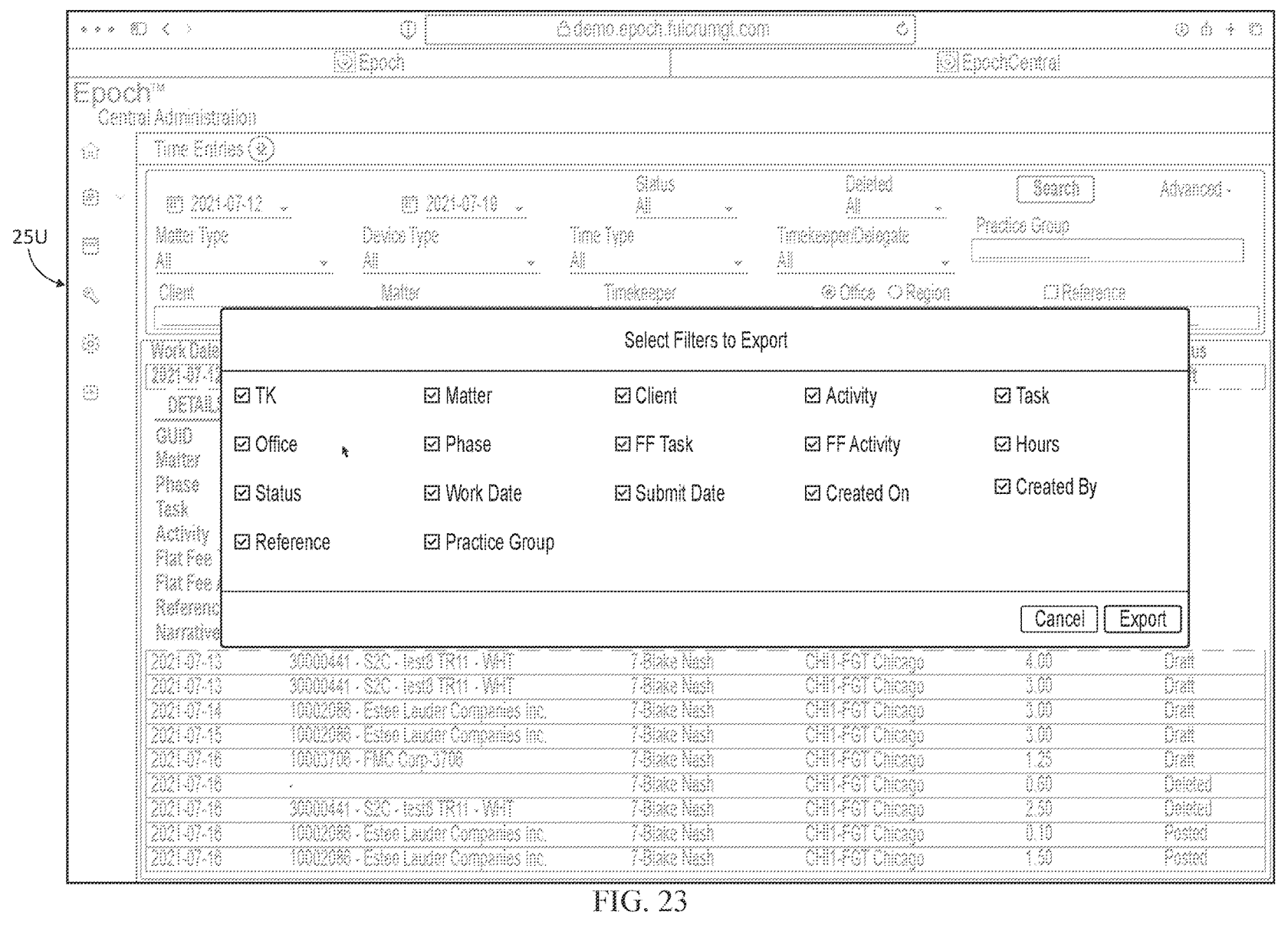

FIG. 23 illustrates an example embodiment of a twenty-first GUI 25T displayed on a user terminal 14 (e.g., a first user terminal 14a) for a user U (e.g., a first user $U_1$) in accordance with the present disclosure. The twenty-first GUI 25T enables the user U to export a report (for example a work-in-progress report or a billing report) which includes categories desired by the user U.

In an embodiment, the system 10 automatically generates a work-in-progress report at predetermined intervals using filters selected by the first user $U_1$ or another user U (e.g., the filters shown in FIG. 23). In an embodiment, the system automatically sends the work-in-progress report to a predetermined group of users U.

In an embodiment, the system 10 automatically generates a billing report at predetermined intervals using filters selected by the first user $U_1$ or another user U (e.g., the filters shown in FIG. 23). In an embodiment, the system 10 automatically sends the billing report to a predetermined group of users U. In an embodiment, the system 10 automatically sends the billing report to a corresponding second party P2, for example, via the network 16.

The systems and methods described herein are advantageous for time entry, management and billing because they improve the user experience, optimize processing, and conserve memory space. It should be understood that various changes and modifications to the methods described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a connecting device.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A system for collaborative time entry, the system comprising:
    a plurality of user terminals each including a user input device configured to receive one or more time entries, the plurality of user terminals including at least a first user terminal corresponding to a first user and a second user terminal corresponding to a second user;
    at least one memory configured to store time entry data corresponding to the one or more time entries; and
    at least one processor programmed to: (i) on at least one first graphical user interface on the first user terminal, cause creation of a usable time icon corresponding to a running timer not associated with a specific client; (ii) enable selection of the usable time icon by the first user to convert the usable time icon into a first time entry with details regarding at least one of client or matter; (iii) on the at least one first graphical user interface on the first user terminal, enable the first user to link the first time entry to the second user; (iv) cause the memory to store at least a portion of the time entry data from the first time entry; (v) cause creation of a second time entry on a second graphical user interface on the second user terminal, the second time entry including at least the portion of the time entry data from the first time entry; and (vi) cause generation of a report including the first time entry and the second time entry.

2. The system of claim 1, comprising
    a central server in wireless communication with the first user terminal and the second user terminal, the central server including the processor and the memory.

3. The system of claim 1, wherein
    the processor is programmed to cause the memory to delete at least part of the portion of the time entry data stored in the memory after posting of the second time entry by the second user via the second graphical user interface.

4. The system of claim 1, wherein
    the processor is programmed to export an amount of time recorded by the running timer into the first time entry.

5. A method of collaborative time entry, the method comprising:
    on at least one first graphical user interface on a first user terminal, causing creation of a usable time icon corresponding to a running timer not associated with a specific client;
    enabling selection of the usable time icon by a first user to convert the usable time icon into a first time entry with details regarding at least one of client or matter;

on the at least one first graphical user interface on the first user terminal, enabling the first user to link the first time entry to a second user;

storing in a memory at least a portion of time entry data from the first time entry;

creating a second time entry on a second graphical user interface on a second user terminal of the second user, the second time entry including at least the portion of the time entry data from the first time entry; and generating a report including the first time entry and the second time entry.

6. The method of claim 5, comprising
storing the portion of time entry data from the first time entry in a central memory that is in wireless communication with the first user terminal and the second user terminal.

7. The method of claim 5, comprising
filtering part of the time entry data based on a user selection when generating the report.

8. The method of claim 5, comprising
automatically sending the report including the first time entry and the second time entry to a second party, the first user terminal and the second user terminal controlled by a first party.

9. The method of claim 5, comprising
causing the memory to delete at least part of the portion of the time entry data stored in the memory after posting of the second time entry by the second user via the second graphical user interface.

10. The method of claim 5, comprising
using the running timer to determine an amount of time of a meeting involving the first user and the second user.

11. The method of claim 5, comprising
using the running timer to determine an amount of time that an external computer program is used by the first user terminal.

12. The method of claim 5, comprising
using the running timer to determine an amount of time that a website is accessed by the first user terminal.

13. A system for collaborative time entry, the system comprising:

at least one memory configured to store time entry data corresponding to one or more time entries; and at least one processor programmed to: (i) on at least one first graphical user interface of a first user terminal, cause creation of a usable time icon corresponding to a running timer not associated with a specific client; (ii) enable selection of the usable time icon by a first user to convert the usable time icon into a first time entry with details regarding at least one of client or matter; (iii) on the at least one first graphical user interface of the first user terminal, enable the first user to link the first time entry to a second user; (iv) cause the memory to store at least a portion of the time entry data from the first time entry; (v) cause creation of a second time entry on a second graphical user interface on a second user terminal of the second user, the second time entry including at least the portion of the time entry data from the first time entry; and (vi) cause generation of a report including the first time entry and the second time entry.

14. The system of claim 13, comprising
a central server in wireless communication with the first user terminal and the second user terminal, the central server including the processor and the memory.

15. The system of claim 13, wherein
the processor is programmed to filter part of the time entry data based on a user selection when generating the report.

16. The system of claim 13, wherein
the processor is programmed to cause the memory to delete at least part of the portion of the time entry data stored in the memory after posting of the second time entry by the second user via the second graphical user interface.

17. The system of claim 13, wherein
the processor is programmed to export an amount of time recorded by the running timer into the first time entry.

18. The system of claim 13, wherein
the processor is programmed to use the running timer to determine an amount of time that an external computer program is used by the first user terminal.

19. The system of claim 13, wherein
the processor is programmed to use the running timer to determine an amount of time that a website is accessed by the first user terminal.

20. The system of claim 13, wherein
the processor is programmed to merge at least two time entries to create the first time entry displayed on the at least one first graphical user interface.

* * * * *